(12) United States Patent
Nagashima et al.

(10) Patent No.: US 11,809,132 B2
(45) Date of Patent: Nov. 7, 2023

(54) TONER

(71) Applicant: CANON KABUSHIKI KAISHA, Tokyo (JP)

(72) Inventors: Yuujirou Nagashima, Shizuoka (JP); Yasuhiro Hashimoto, Shizuoka (JP); Koji Nishikawa, Shizuoka (JP); Tomoya Nagaoka, Tokyo (JP); Shuntaro Watanabe, Kanagawa (JP); Hiroki Akiyama, Shizuoka (JP); Hiroki Kagawa, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 17/197,102

(22) Filed: Mar. 10, 2021

(65) Prior Publication Data
US 2021/0302856 A1    Sep. 30, 2021

(30) Foreign Application Priority Data
Mar. 16, 2020 (JP) .................. 2020-045833

(51) Int. Cl.
*G03G 9/083* (2006.01)
*G03G 9/097* (2006.01)
(Continued)

(52) U.S. Cl.
CPC ... *G03G 9/09775* (2013.01); *C08F 220/1818* (2020.02); *C08G 77/04* (2013.01);
(Continued)

(58) Field of Classification Search
None
See application file for complete search history.

(56) References Cited

U.S. PATENT DOCUMENTS 5,413,890 A * 5/1995 Mori .................. G03G 9/08728
                                                                    430/108.4
5,601,913 A    2/1997 Ohtani et al.
(Continued)

FOREIGN PATENT DOCUMENTS

| EP | 3674800 A1 * | 7/2020 | ........... C08G 77/045 |
| JP | 4-50859 A | 2/1992 | |
| JP | 2020109506 A * | 7/2020 | ........... G03G 9/0819 |

OTHER PUBLICATIONS

JP 2020109506 translation (Year: 2022).*
(Continued)

*Primary Examiner* — Peter L Vajda
(74) *Attorney, Agent, or Firm* — VENABLE LLP

(57) ABSTRACT

A toner is provided, which has a toner particle that contains a binder resin, and organosilicon polymer particle on a surface of the toner particle. A methanol concentration a (vol %) of the organosilicon polymer particle in a wettability test and a methanol concentration b (vol %) of the toner particle in a wettability test satisfy Expression (I) below:

$|a-b| \leq 25$    (I), and an adhesion index of the organosilicon polymer particle on a polycarbonate film, calculated on the basis of Expression (II) below, is not more than 3.5:

Adhesion index=area ratio $c$ of the organosilicon polymer particle having migrated to the polycarbonate film/coverage ratio $d$ of the organosilicon polymer particle on the surface of the toner particle×100    (II).

6 Claims, 3 Drawing Sheets

(51) Int. Cl.
*G03G 9/08* (2006.01)
*C08G 77/04* (2006.01)
*C08F 220/18* (2006.01)
*G03G 9/087* (2006.01)

(52) U.S. Cl.
CPC ......... *G03G 9/0819* (2013.01); *G03G 9/0821* (2013.01); *G03G 9/08711* (2013.01)

(56) References Cited

U.S. PATENT DOCUMENTS

| | | | |
|---|---|---|---|
| 5,955,233 A * | 9/1999 | Urashima | G03G 9/08753 430/109.2 |
| 7,014,969 B2 | 3/2006 | Yachi et al. | |
| 7,112,393 B2 | 9/2006 | Komoto et al. | |
| 7,273,686 B2 | 9/2007 | Onuma et al. | |
| 7,288,354 B2 | 10/2007 | Moribe et al. | |
| 7,306,889 B2 | 12/2007 | Okubo et al. | |
| 7,351,509 B2 | 4/2008 | Moribe et al. | |
| 7,422,832 B2 | 9/2008 | Ogawa et al. | |
| 7,459,253 B2 | 12/2008 | Abe et al. | |
| 7,582,401 B2 | 9/2009 | Ogawa et al. | |
| 7,745,089 B2 | 6/2010 | Okubo et al. | |
| 8,053,156 B2 | 11/2011 | Abe et al. | |
| 8,247,147 B2 | 8/2012 | Abe et al. | |
| 8,367,289 B2 | 2/2013 | Isono et al. | |
| 8,440,382 B2 | 5/2013 | Isono et al. | |
| 8,497,054 B2 | 7/2013 | Sugiyama et al. | |
| 8,603,712 B2 | 12/2013 | Aoki et al. | |
| 8,652,737 B2 | 2/2014 | Handa et al. | |
| 8,741,519 B2 | 6/2014 | Watanabe et al. | |
| 8,778,581 B2 | 7/2014 | Nonaka et al. | |
| 8,785,101 B2 | 7/2014 | Kaya et al. | |
| 8,846,284 B2 | 9/2014 | Kinumatsu et al. | |
| 8,916,319 B2 | 12/2014 | Ikeda et al. | |
| 8,940,467 B2 | 1/2015 | Hashimoto et al. | |
| 9,201,323 B2 | 12/2015 | Nishikawa et al. | |
| 9,229,345 B2 | 1/2016 | Ikeda et al. | |
| 9,250,548 B2 | 2/2016 | Nomura et al. | |
| 9,261,804 B2 | 2/2016 | Yamazaki et al. | |
| 9,309,349 B2 | 4/2016 | Watanabe et al. | |
| 9,341,970 B2 | 5/2016 | Yoshiba et al. | |
| 9,423,714 B2 | 8/2016 | Kenmoku et al. | |
| 9,429,860 B2 | 8/2016 | Kinumatsu et al. | |
| 9,470,993 B2 | 10/2016 | Nishikawa et al. | |
| 9,588,450 B2 | 3/2017 | Tsuda et al. | |
| 9,606,462 B2 | 3/2017 | Nomura et al. | |
| 9,625,844 B2 | 4/2017 | Kaya et al. | |
| 9,658,554 B2 | 5/2017 | Kinumatsu et al. | |
| 9,715,188 B2 | 7/2017 | Terauchi et al. | |
| 9,772,570 B2 | 9/2017 | Tsuda et al. | |
| 9,798,256 B2 | 10/2017 | Kosaki et al. | |
| 9,798,262 B2 | 10/2017 | Toyoizumi et al. | |
| 9,804,514 B2 | 10/2017 | Suzumura et al. | |
| 9,811,016 B2 | 11/2017 | Aoki et al. | |
| 9,823,595 B2 | 11/2017 | Toyoizumi et al. | |
| 9,829,818 B2 | 11/2017 | Yoshiba et al. | |
| 9,841,692 B2 | 12/2017 | Hasegawa et al. | |
| 9,857,713 B2 | 1/2018 | Kosaki et al. | |
| 9,869,943 B2 | 1/2018 | Aoki et al. | |
| 9,964,874 B2 | 5/2018 | Suzumura et al. | |
| 9,971,263 B2 | 5/2018 | Fukudome et al. | |
| 10,012,919 B2 | 7/2018 | Matsui et al. | |
| 10,101,683 B2 | 10/2018 | Nishikawa et al. | |
| 10,156,800 B2 | 12/2018 | Tsuda et al. | |
| 10,197,934 B2 | 2/2019 | Matsui et al. | |
| 10,228,627 B2 | 3/2019 | Nagashima et al. | |
| 10,289,016 B2 | 5/2019 | Fukudome et al. | |
| 10,295,920 B2 | 5/2019 | Nishikawa et al. | |
| 10,295,921 B2 | 5/2019 | Ohmori et al. | |
| 10,303,075 B2 | 5/2019 | Tanaka et al. | |
| 10,310,397 B2 | 6/2019 | Sano et al. | |
| 10,409,180 B2 | 9/2019 | Koji et al. | |
| 10,698,327 B2 | 6/2020 | Nagashima et al. | |
| 10,732,529 B2 | 8/2020 | Yoshiba et al. | |
| 10,747,134 B2 | 8/2020 | Watanabe et al. | |
| 10,768,540 B2 | 9/2020 | Watanabe et al. | |
| 10,845,722 B2 | 11/2020 | Nishikawa et al. | |
| 10,852,650 B2 | 12/2020 | Inoue et al. | |
| 10,942,463 B2 | 3/2021 | Yoshiba et al. | |
| 10,969,704 B2 | 4/2021 | Kagawa et al. | |
| 10,983,450 B2 | 4/2021 | Nomura et al. | |
| 10,983,451 B2 | 4/2021 | Hashimoto et al. | |
| 10,996,577 B2 | 5/2021 | Nishikawa et al. | |
| 11,003,103 B2 | 5/2021 | Kinumatsu et al. | |
| 2005/0026061 A1 * | 2/2005 | Mikuriya | G03G 9/09716 430/108.1 |
| 2006/0057483 A1 * | 3/2006 | Yanase | G03G 9/08795 430/108.4 |
| 2007/0166636 A1 * | 7/2007 | Daimon | G03G 9/08724 430/110.2 |
| 2010/0035171 A1 | 2/2010 | Watanabe et al. | |
| 2015/0125790 A1 | 5/2015 | Hotta et al. | |
| 2015/0220013 A1 | 8/2015 | Nishikawa et al. | |
| 2016/0161874 A1 | 6/2016 | Yamazaki et al. | |
| 2016/0378003 A1 * | 12/2016 | Arimura | G03G 9/0836 430/110.1 |
| 2017/0123333 A1 | 5/2017 | Kuroki et al. | |
| 2017/0227861 A1 * | 8/2017 | Zenitani | G03G 15/08 |
| 2019/0384195 A1 | 12/2019 | Saeki et al. | |
| 2020/0026208 A1 * | 1/2020 | Terui | G03G 9/08755 |
| 2020/0166861 A1 | 5/2020 | Uratani et al. | |
| 2020/0209768 A1 * | 7/2020 | Furui | G03G 9/09775 |
| 2020/0285164 A1 | 9/2020 | Akiyama et al. | |
| 2020/0319567 A1 | 10/2020 | Yoshiba et al. | |
| 2020/0363746 A1 | 11/2020 | Komiya et al. | |
| 2020/0379363 A1 | 12/2020 | Nagaoka et al. | |
| 2021/0055667 A1 | 2/2021 | Watanabe et al. | |
| 2021/0080846 A1 | 3/2021 | Mizuguchi et al. | |

OTHER PUBLICATIONS

JP 2020109506A translation (Year: 2023).*
Robert F. Fedors, "A Method for Estimating Both the Solubility Parameters and Molar Volumes of Liquids", Polymer Engineering and Science, Feb. 1974, vol. 14, No. 2, 147-154.

* cited by examiner

TONER

BACKGROUND OF THE INVENTION

Field of the Invention

The present disclosure relates to a toner used in a recording method that relies, for instance, on an electrophotographic method, an electrostatic recording method, or a toner jet recording method.

Description of the Related Art

In recent years, for image forming apparatuses such as copiers and printers that utilize electrophotographic technologies, diversification in the purposes and environments of usage thereof is ongoing. This has been accompanied by a strong demand for longer apparatus life and smaller apparatus size. Reducing toner consumption is important from the viewpoint of achieving reductions in apparatus size. The volume of toner cartridges can be reduced through a reduction in the consumption amount of a toner. To that end, various toners and external additives have been proposed.

Increasing the transferability of a toner is important in order to reduce toner consumption amounts. To that end, it has been proposed to utilize a toner having an external additive in the form of large-particle diameter silica or resin fine particles as spacer particles. Although the toner resulting from external addition of large-particle diameter silica and/or resin fine particles exhibits favorable initial characteristics, the external additive is prone to migrate gradually from the surface of the toner particle to the surface of another toner particle or to a cartridge member, as a result of repeated rubbing of the toner within a developing device. Moreover, the external additive becomes readily buried in the toner particle surface. Accordingly, in terms of achieving a longer life, maintaining transferability over long periods of time has been an issue. The term "migration" denotes herein movement and adhesion of the external additive from a toner onto the surface of another toner particle or a cartridge member. Silica is a highly resistant material, and therefore rolls over the surface of the toner particle and becomes unevenly distributed thereon, as a result of which a skewed local charging distribution tends to arise on the surface of the toner particle.

The charging performance of the toner improves readily in low-temperature, low-humidity environments (for instance, 15° C./10 RH %), and in consequence the electrostatic attachment force of the toner increases readily. In addition, flowability thereof tends to decrease, and a charge distribution readily becomes non-uniform, which has given rise to the problem of yet more pronounced drops in transferability. As a solution to such problems, an organosilicon polymer particle have therefore been studied. An organosilicon polymer particle is more elastic and less hard than general inorganic materials; accordingly, through the use of an organosilicon polymer particle as an external additive, burying of the external additive into the toner particle surface can be suppressed, even when the toner is rubbed within the developing device.

On the other hand, however, the organosilicon polymer particle do not stick readily to the surface of the toner particle, and are prone to migrate and become unevenly distributed. As a result, it is still problematic to achieve stable charging performance for long-term use. The method below has therefore been proposed as one method for satisfying charging characteristics in long-term use. Japanese Patent Application Publication No. H04-50859 describes a method for stabilizing charging performance of a toner even in long-term use through adhesion or burying of true-spherical silicone fine particles.

SUMMARY OF THE INVENTION

The durability and charging performance of the toner described Japanese Patent Application Publication No. H04-50859 can be improved to certain extent. However, uniformity of charge distribution in low-temperature, low-humidity environments is still insufficient, and thus it is found that there is room for further study as regards transferability. Specifically, the present disclosure provides a toner exhibiting excellent charging performance and durability, and superior transferability even upon long-term use in low-temperature, low-humidity environments.

A toner comprising:
a toner particle that contains a binder resin, and
an organosilicon polymer particle on a surface of the toner particle, wherein
with a (vol %) being a methanol concentration at a time of a transmittance of 50% relative to light of a wavelength of 780 nm in a wettability test, in which a methanol/water mixed solvent is utilized, on the organosilicon polymer particle, and
with b (vol %) being the methanol concentration at a time of a transmittance of 50% relative to light of a wavelength of 780 nm in a wettability test, in which a methanol/water mixed solvent is utilized, on the toner particle,
Expression (I) below is satisfied:

$$|a-b| \leq 25 \qquad (I), and$$

an adhesion index of the organosilicon polymer particle on a polycarbonate film, calculated on the basis of Expression (II) below, is not more than 3.5:

Adhesion index=area ratio $c$ of the organosilicon polymer particle having migrated to the polycarbonate film/coverage ratio $d$ of the organosilicon polymer particle on the surface of the toner particle×100 (II).

The present disclosure succeeds in providing a toner exhibiting excellent charging performance and durability, and superior transferability even upon long-term use in low-temperature, low-humidity environments. Further features of the present invention will become apparent from the following description of exemplary embodiments with reference to the attached drawing.

DESCRIPTION OF THE EMBODIMENTS

Figure 1:
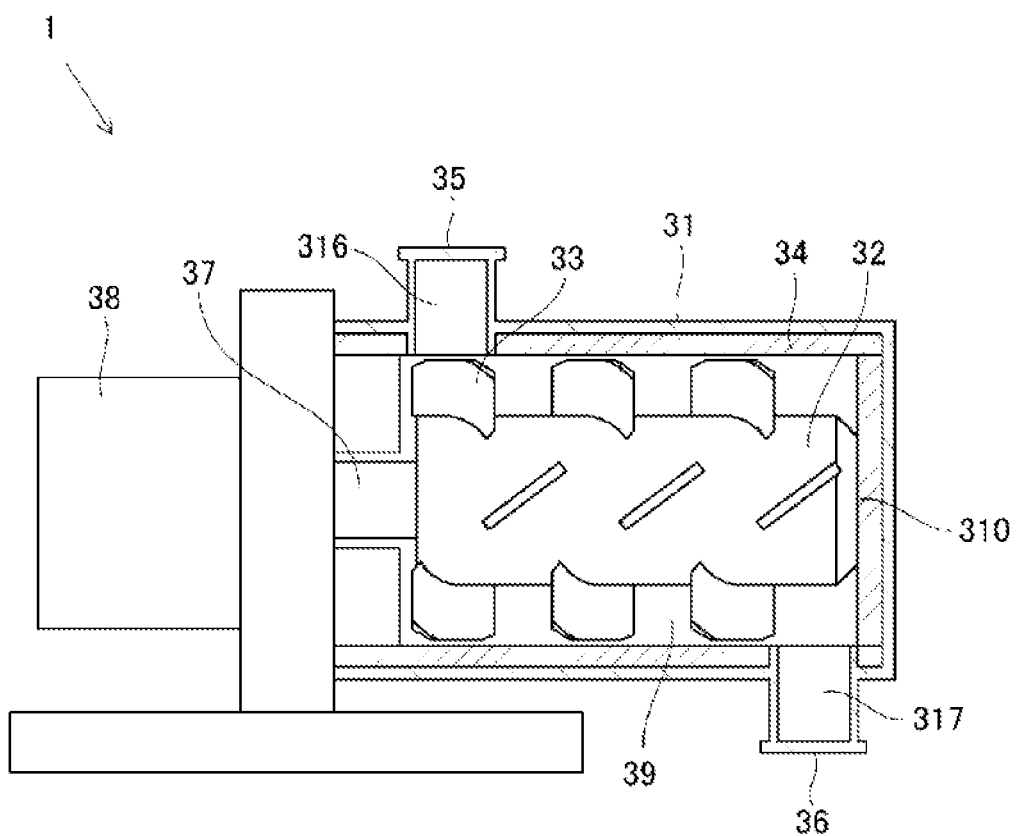
FIG. 1 is a schematic diagram illustrating an example of a mixing process apparatus.

Unless specifically indicated otherwise, the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination.

The term (meth)acrylic acid ester refers to an acrylic acid ester and/or methacrylic acid ester. The term "monomer unit" denotes a form, in a polymer, resulting from reaction of a monomer substance. For instance, one unit is herein one carbon-carbon bond section in a main chain of a polymer and that results from polymerization of a vinyl-based monomer. The vinyl-based monomer can be represented by Formula (Z) below.

In Formula (Z), $R_{Z1}$ represents a hydrogen atom or an alkyl group (preferably a C1 to C3 alkyl group, and more preferably a methyl group), and $R_{Z2}$ represents an arbitrary substituent. The term crystalline resin denotes a resin exhibiting a distinct endothermic peak in a differential scanning calorimetry (DSC) measurement.

Transferability will be addressed first. Focusing on the problem of transferability, toner on the electrostatic latent image bearing member may in some instances fail to be transferred, even when acted upon by transfer bias, onto the recording medium through electrostatic attraction. This arises from a high electrostatic or non-electrostatic attachment force of the toner onto the electrostatic latent image bearing member. When the ratio of toner of reverse polarity is high, moreover, the toner may fail to be transferred even when acted upon by transfer bias.

In order to solve such problems relating to transferability it is important to reduce electrostatic or non-electrostatic attachment forces or to render uniform a charge distribution across toner particles. The toner is repeatedly rubbed in the developing device, in long-term use of the apparatus, and as a result the external additive migrates from the toner particle surface, or becomes gradually embedded in the toner particle. A problem arises as a result in that it is difficult to maintain transferability on account of the increased non-electrostatic adhesive forces and the decreased uniformity in charge distribution across toner particles. Therefore, the present inventors have studied methods for achieving stable transferability also in long-term use.

The inventors focused first on an organosilicon polymer particle as a method for improving transferability. The inventors studied a method for stabilizing charge over long periods of time, by exploiting the elasticity and charging performance of an organosilicon polymer particle. The term elasticity denotes herein a property of resilience without plastic deformation, even when being acted upon by an external force such as rubbing, inside a cartridge. An organosilicon polymer particle is more elastic and less hard than general inorganic materials and resin fine particles; accordingly, the inventors surmised that, through the use of such particle as an external additive, burying of the external additive into the toner particle surface can be suppressed, even when the toner is rubbed. The inventors also envisaged suppression of the migration of an organosilicon polymer particle, by increasing the adhesion of the organosilicon polymer particle onto the toner particle surface. Studies results revealed that by increasing the adhesion of the organosilicon polymer particle it became possible to achieve an elastic effect in toner, and to suppress migration and embedding of the external additive with prolonged use.

However, transferability during long-term use in a low-temperature, low-humidity environment could not be sufficiently improved by resorting to just the above-described configuration alone. Charging distribution stability over long periods of time is still difficult to achieve in low-temperature, low-humidity environments. Also, an elastic organosilicon polymer particle does not readily stick to the toner particle surface over long periods of time, and an organosilicon polymer particle migrates readily from the toner particle surface as a result of rubbing acting upon the particle within the developing device.

Therefore, the present inventors studied a method for further improving transferability. As a result of diligent research the inventors found that, in addition to adhesion of an organosilicon polymer particle to a toner particle, transferability in long-term use can also be improved by reducing the difference between the wettability of the toner particle and the wettability of the organosilicon polymer particle.

The inventors arrived at the following conceivable underlying reasons for the above effect. The term wettability refers herein to the methanol concentration at the time of a 50% transmittance to light having a wavelength of 780 nm in a wettability test that utilizes a methanol/water mixed solvent. Wettability denotes the degree of hydrophilicity/hydrophobicity of a material surface. By bringing the wettability of the surface of the toner particle and the wettability of the surface of the organosilicon polymer particle close to each other it becomes possible to reduce surface tension at the interface between the foregoing. As a result, the foregoing can be brought into close, gap-less contact with each other at the time of external addition, and detachment of the organosilicon polymer particle can be suppressed. Moreover, since charge of the organosilicon polymer particle can be allowed to diffuse to the toner particle surface, it is found that as a result the charge distribution of the toner particle surface can be made uniform.

When the wettability of the organosilicon polymer particle and the wettability of the toner diverge from each other it becomes difficult to bring the foregoing into gap-less, close contact with each other at the time of external addition. Even when the organosilicon polymer particle and the toner particle are brought into close contact with each other, small gaps (cracks) are prone to occur at the interface between the foregoing, as a result of being rubbed on account of long-term use. It is considered that, in consequence, the organosilicon polymer particle migrate readily on account of being rubbed within the developing device, and the above effect is not achieved readily, since the charge diffusion effect described above is less likely to be brought out. From the above standpoints, it has been found that transferability in long-term use in a low-temperature, low-humidity environment can be improved by eliciting firm adhesion of the organosilicon polymer particle to the toner particle surface, while bringing the wettability of the toner particle surface and the wettability of the organosilicon polymer particle close to each other.

Specifically, the present invention relates to a toner, having a toner particle that contains a binder resin, and an organosilicon polymer particle on the surface of the toner particle, wherein with a (vol %) as a methanol concentration at the time of a transmittance of 50% to light of a wavelength of 780 nm in a wettability test, of the organosilicon polymer particle, in which a methanol/water mixed solvent is utilized, and with b (vol %) as the methanol concentration at the time of a transmittance of 50% to light of a wavelength of 780 nm in a wettability test, of the toner particle, in which a methanol/water mixed solvent is utilized, Expression (I) below is satisfied.

$$|a-b| \leq 25 \tag{I}$$

An adhesion index of the organosilicon polymer particle on a polycarbonate film, calculated on the basis of Expression (II) below, is not more than 3.5.

Adhesion index=area ratio $c$ of the organosilicon polymer particle having migrated to the polycarbonate film/coverage ratio $d$ of the organosilicon polymer particle on the surface of the toner particle×100 (II)

As per Expression (I) above, the absolute value of the difference between the methanol concentration a (vol %) of the organosilicon polymer particle and the methanol concentration b (vol %) of the toner particle, in a wettability test, must be not more than 25. By prescribing ja-b to be not more than 25 it becomes possible to suppress the occurrence of cracks at the interface between the organosilicon polymer particle and the toner, so that transferability is enhanced as a result. In order to elicit the above effect more pronouncedly, |a−b| is preferably not more than 20, and more preferably not more than 15. The lower limit of |a−b| is not particularly restricted, but is preferably at least 0. The difference in wettability can be controlled to lie in the above ranges through modification of the type and amount of the materials of the toner particle and the composition and surface treatment of the organosilicon polymer particle.

The methanol concentration a is preferably 50 to 100 vol %, and more preferably 55 to 90 vol %. By virtue of the fact that wettability lies within the above range, drops in the charge of the organosilicon polymer particle can be suppressed, affinity to the toner particle is readily improved, and drops in transferability can be readily suppressed also in high-temperature, high-humidity environments (30° C., 80 RH %). The wettability of the organosilicon polymer particle can be controlled on the basis of the composition of the organosilicon polymer particle and the type and amount of a surface treatment material. The methanol concentration b is preferably 20 to 100 vol %, and more preferably 30 to 80 vol %.

Further, an adhesion index of the organosilicon polymer particle to a polycarbonate film, calculated on the basis of Expression (II) below, must be not more than 3.5.

Adhesion index=area ratio $c$ of the organosilicon polymer particle having migrated to polycarbonate film/coverage ratio $d$ of the organosilicon polymer particle on the toner particle surface×100 (II)

The adhesion index is preferably not more than 3.2, and more preferably not more than 3.0.

The adhesion index is a value denoting the readiness with which the organosilicon polymer particle migrates to the polycarbonate film. A smaller numerical value signifies that the organosilicon polymer particle separates less readily from the toner particle, and migrates less readily towards other members. The organosilicon polymer particle can be caused to stick more readily by prescribing the properties of the surface of the organosilicon polymer particle and of the toner particle surface to be similar to each other. The adhesion index can be controlled through modification of external addition conditions and through control of the wettability of the toner particle and of the organosilicon polymer particle. By prescribing the adhesion index to be not more than 3.5, migration of the organosilicon polymer particle can be suppressed, even when these are rubbed within a developing machine, and transferability in long-term use is improved. The lower limit is not particularly restricted, but is preferably at least 0.0.

A preferred form of toner will be explained the following. The organosilicon polymer particle will now be particularly described. The organosilicon polymer particle is a resin particle constituted of a main chain formed by the bonding of oxygen in alternation with organic group-bearing silicon. The method for producing the organosilicon polymer particle is not particularly limited, and, for example, the organosilicon polymer particle can be obtained by the dropwise addition of a silane compound to water with execution of hydrolysis and a condensation reaction in the presence of a catalyst, followed by filtration of the resulting suspension and drying. The number-average primary particle diameter of the organosilicon polymer particle can be controlled through, for example, the type of catalyst, the blending ratios, the temperature at the start of the reaction, and the length of dropwise addition. The catalyst can be exemplified by acidic catalysts such as hydrochloric acid, hydrofluoric acid, and nitric acid, and by basic catalysts such as aqueous ammonia, sodium hydroxide, and potassium hydroxide, but there is no limitation to these.

The organosilicon polymer particle has a structure in which the silicon atom and oxygen atom are bonded in alternation, and preferably has the T3 unit structure given by formula (1) below. In 29Si-NMR measurement of the organosilicon polymer particle, the proportion of the peak area originating with silicon having the T3 unit structure, to the total peak area originating with all the element silicon contained in the organosilicon polymer particle, is preferably 0.50 to 1.00. 0.70 to 1.00 is more preferred, and 0.90 to 1.00 is still more preferred. When this range is observed, a suitable elasticity can be conferred on the organosilicon polymer particle and the effects with regard to the long-term durability are then readily obtained. The proportion of the peak area originating with silicon having the T3 unit structure can be controlled by changing the type of the organosilicon compounds used in the polymerization that yields the organosilicon polymer particle and in particular by changing the type and/or the proportion of the trifunctional silane.

$$R^1\text{—SiO}_{3/2} \tag{1}$$

(In formula (1), $R^1$ represents an alkyl group having from 1 to 6 (preferably from 1 to 4 and more preferably 1 or 2) carbons or a phenyl group.)

The organosilicon polymer particle preferably is a condensation polymer of an organosilicon compound having the structure given by the following formula (2).

(In formula (2), $R^2$, $R^3$, $R^4$, and $R^5$ each independently represent an alkyl group having from 1 to 6 (preferably from 1 to 4 and more preferably 1 or 2) carbons, a phenyl group, or a reactive group (for example, a halogen atom, hydroxy group, acetoxy group, or alkoxy group (having preferably from 1 to 6 carbons and more preferably from 1 to 3 carbons)).)

An organosilicon compound having four reactive groups in each formula (2) molecule (tetrafunctional silane), an organosilicon compound having in formula (2) an alkyl group or phenyl group for $R^2$ and three reactive groups ($R^3$, $R^4$, $R^5$)(trifunctional silane), an organosilicon compound having in formula (2) an alkyl group or phenyl group for $R^2$ and $R^3$ and two reactive groups ($R^4$, $R^5$) (difunctional silane), and an organosilicon compound having in formula (2) an alkyl group or phenyl group for $R^2$, $R^3$, and $R^4$ and one reactive group ($R^5$) (monofunctional silane) can be used to obtain the organosilicon polymer particles The use of at least 50 mol % trifunctional silane for the organosilicon compound is preferred in order to obtain 0.50 to 1.00 for the proportion for the area of the peak originating with the T3 unit structure.

$R^2$ in formula (2) is preferably an alkyl group having from 1 to 6 (preferably from 1 to 4 and more preferably 1 or 2) carbons or a phenyl group. $R^3$, $R^4$, and $R^5$ are preferably each independently a reactive group (halogen atom, hydroxy group, acetoxy group, or alkoxy group (having preferably from 1 to 6 carbons and more preferably from 1 to 3 carbons)).

The organosilicon polymer particle can be obtained by causing the reactive groups to undergo hydrolysis, addition polymerization, and condensation polymerization to form a crosslinked structure. The hydrolysis, addition polymerization, and condensation polymerization of $R^3$, $R^4$, and $R^5$ can be controlled using the reaction temperature, reaction time, reaction solvent, and pH.

The tetrafunctional silane can be exemplified by tetramethoxysilane, tetraethoxysiane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorouilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilano, ethyltriethoxysilane, ethyltrichorosilane, ethyltriacetoxysilane, ethyltrihydroxysilane, propyltrimethoxysilane, propyltriethoxysilane, propyltrichlorosilane, propyhriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, phenyltrihydroxysilane, and pentyltrimethoxysilane.

The difunctional silane can be exemplified by di-tert-butyldichlorosilane, di-tert-butyldimethoxysilane, di-tert-butyldiethoxysilane, dibutyldichorosilane, dibutyldimethoxysilane, dibutyldiethoxysilmne, dichlorodecylmethylsilane, dimethoxydecyhnethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The organosilicon polymer particle may be subjected to a surface treatment with the goal of imparting hydrophobicity. The hydrophobic treatment agent can be exemplified by chlorosilanes, e.g., methytrichlorosilane, dimethyldichlorosilane, trimethylchlorosilane, phenyltrichlorosilane, diphenyklichlorosilane, t-butyldimethylchlorosilane, and vinyltrichlorosilane;

alkoxysilanes, e.g., tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, isobutyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, isobutyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopmpyltriethoxysilane,γ-(2-aminoethyl)aminopropyltrimethoxysilane, γ-(2-aminoethyl)aminopropylmethyldimethoxysilane, N-phenyl-3-aminopropyltrimethoxysilane, N-(2-aminoethyl)-3-aminopropyltrimethoxysilane, and N-β-(N-vinylbenzylaminoethyl)-γ-aminopropyltrimethoxysilane;

silazanes, e.g., hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazne;

silicone oils, e.g., dimethylsilicone oil, methythydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal-reactive silicone oil;

siloxanes, e.g., hexamethylcyclotrisiloxane, octamethylcyclotetrasiloxane, decamethylcyclopentasiloxane, hexamethyldisiloxane, and octamethyltrisiloxane; and fatty acids and their metal salts, e.g., long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, and arachidonic acid, as well as salts of these fatty acids with metals such as zinc, iron, magnesium, aluminum, calcium, sodium, and lithium.

The use is preferred among the preceding of alkoxysilanes, silazanes, and silicone oils because they support facile execution of the hydrophobic treatment. A single one of these hydrophobic treatment agents may be used by itself or two or more may be used in combination.

The number-average particle diameter of the primary particle of the organosilicon polymer particle is preferably 0 to 500 nm, and more preferably 20 to 300 nm. When the number-average particle diameter of the primary particle lies in the above range, long-term durability and flowability are readily improved, and consistency of solid images is readily improved also with prolonged use in low-temperature, low-humidity environments. When the number-average particle diameter of the primary particle of the organosilicon polymer particle is sat least 10 nm, a spacer effect is readily achieved, while when the number-average particle diameter is not more than 500 nm, flowability is readily achieved. The number-average particle diameter of the primary particle of the organosilicon polymer particle can be controlled through modification of the production conditions of the organosilicon polymer particle.

The content of the organosilicon polymer particle in the toner is preferably 0.1 to 10.0 mass %, more preferably 0.2 to 6.0 mass, and yet more preferably 0.3 to 3.0 mass %.

A relative permittivity era of the organosilicon polymer particle, measured at 10 Hz, is more preferably not more than 3.50, and more preferably not more than 2.60. It is found that relative permittivity of the surface of the organosilicon polymer particle can be grasped through a measurement at a low frequency of 10 Hz. When the relative permittivity era is not more than 3.5, uniformity of charge distribution is readily improved, and transferability in a low-temperature, low-humidity environment is likewise readily improved. The lower limit is not particularly restricted, but is preferably 1.50 or more, and more preferably at least 2.00. The relative permittivity era can be controlled through modification of the composition, production conditions, surface state and/or surface treatment of the organosilicon polymer particle.

A dispersity evaluation index of the organosilicon polymer particle on the toner surface is preferably 0.5 to 2.0, and more preferably 1.0 to 1.5. When the dispersity evaluation index lies within these ranges the durability and flowability of the toner particle is further improved, and in particular the consistency of solid images is readily improved. The dispersity evaluation index of the organosilicon polymer particle can be controlled through modification of the production conditions of the organosilicon polymer particle at a time where these are added.

Figure 3:
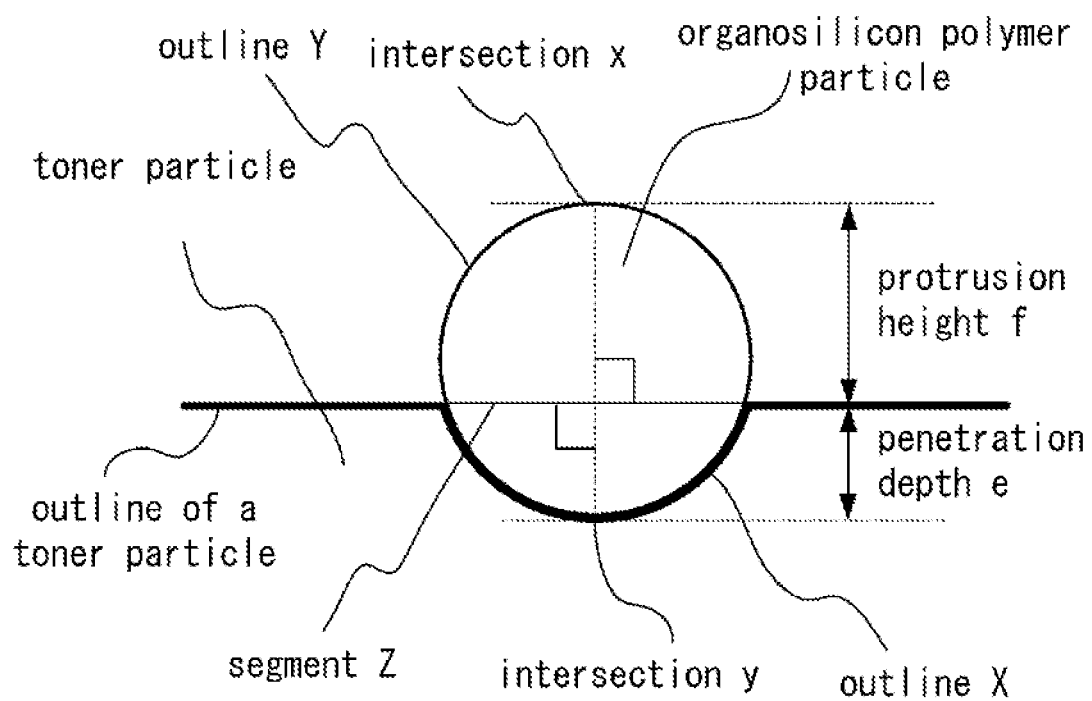
FIG. 3 is a schematic diagram illustrating a method for calculating penetration depth of an organosilicon polymer particle.

Upon observation of a cross-sectional image of the toner using a transmission electron microscope (hereafter also referred to as TEM), in a spread image of the cross-sectional image, obtained through spreading of the outline of the toner particle into a straight line, preferably Expression (IV) below (FIG. 3) is satisfied by a penetration depth e (nm) defined as a penetration depth of an organosilicon polymer particle that penetrate from the surface of the toner particle into the interior of the toner particle, and a protrusion height f (nm) defined as a protrusion height of the organosilicon polymer particle from the surface of the toner particle. More preferably, the penetration depth e and protrusion height f satisfy Expression (IV-B) below.

$$0.05 \le e/(e+f) \le 0.40 \quad \text{(IV)}$$

$$0.05 \le e/(e+f) \le 0.30 \quad \text{(IV-B)}$$

With an outline X defined, in the spread image, as the outline of a portion of contact between an organosilicon polymer particle and the toner particle, in the outline of the organosilicon polymer particle, and with a line segment Z defined as the line segment obtained by joining both ends of the outline X with a straight line, the penetration depth e (nm) of the organosilicon polymer particle denotes a maximum distance between the line segment Z and an intersection x of the outline X and a perpendicular line from the line segment Z to the outline X. With an outline Y defined, in the spread image, as the outline of a portion other than the outline X in the outline of the organosilicon polymer particle, the protrusion height f (nm) of the organosilicon polymer particle denotes a maximum distance between the line segment Z and an intersection y of the outline Y and a perpendicular line from the line segment Z to the outline Y.

By controlling $e/(e+f)$ to lie within the above range it becomes possible to set the barycenter position of the organosilicon polymer particle from the toner particle surface to an appropriate distance. As a result migration of the organosilicon polymer particle and burying of the organosilicon polymer particle into the toner surface are unlikelier to occur, also during long-term use; as a result, the attachment force of the toner onto the electrostatic latent image bearing member can be reduced, and ghosting is unlikelier to occur. Herein $e/(e+f)$ can be controlled through modification of the type and the external addition conditions of the external additive.

Another external additive may be further added to the toner in order to improve the performance of the toner. In this case the content of the external additive (inorganic or organic fine particles) that contain an organosilicon polymer particle is preferably, in total, 0.5 to 10 parts by mass with respect to 100 parts by mass of the toner particle.

A toner particle will be explained next. Preferably, the composition of the toner particle is controlled in order to control Expression (I) so as to lie within a desired range. With a view to combining durability with control of the wettability of the toner particle so as to lie in a high range (high hydrophobicity), it is preferable to control wettability by using a crystalline resin as the binder resin. In order to achieve good charging performance while maintaining high hydrophobicity, it is conceivably preferable to use, as the crystalline resin, for instance a resin having crystalline segments in a side chain. Specifically, the binder resin contains a resin having crystalline segments; preferably the resin having crystalline segments has monomer units represented by Formula (1A) below.

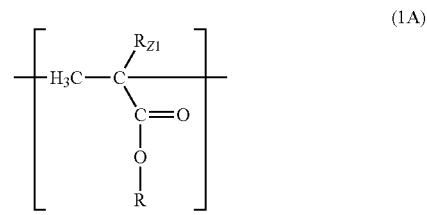

(1A)

In Formula (1A), $R_{Z1}$ represents a hydrogen atom or a methyl group, and R represents a C18 to C36 alkyl group (preferably a C18 to C30 linear alkyl group).

The resin having crystalline segments in a side chain and represented by Formula (1A) is a resin having a side chain (preferably an aliphatic hydrocarbon side chain) being an aliphatic hydrocarbon and/or an aromatic hydrocarbon, in a skeleton (main chain) of an organic structure, such that the resin can exhibit a crystalline structure between the side chains. It is deemed that crystalline resins having crystalline segments in the main chain, typified by crystalline polyesters, crystallize through folding of the main chain, whereas resins having crystalline segments in side chains exhibit crystallization between side chains of one single molecule. Therefore, it is found that the resin can crystallize even in a very narrow region, and a drop in degree of crystallinity derived from the surrounding environment is less likely than in crystalline resins having crystalline segments in the main chain. It is considered that, as a result, both high hydrophobicity and charge distribution uniformity are readily achieved, and also transferability in low-temperature, low-humidity environments and improved electrostatic offset resistance are readily improved. In addition to a resin having crystalline segments, the binder resin may contain a resin such as an amorphous resin.

From the viewpoint of charge distribution uniformity and durability, the content of the resin having crystalline segments, in the binder resin, is preferably 1.0 to 100.0 mass %, more preferably 3.0 to 50.0 mass %, and yet more preferably 15.0 to 40.0 mass %.

The resin having crystalline segments is preferably a polymer A that has first monomer units represented by Formula (1A) and second monomer units different from the first monomer units. Preferably, the polymer A is a vinyl resin.

The first monomer units are preferably monomer units resulting from polymerization of at least one (first polymerizable monomer) selected from the group consisting of (meth)acrylic acid esters having a C18 to C36 alkyl group. The content ratio of the first monomer units in the polymer A is preferably 5.0 to 60.0 mol %, with respect to the total number of moles of all monomer units in the polymer A. More preferably, the content ratio is 10.0 to 40.0 mol %. The content ratio of the first monomer units in the polymer A is preferably 20.0 to 90.0 mass %, and more preferably 40.0 to 80.0 mass/o.

The content ratio of the second monomer units in the polymer A is preferably 20.0 to 95.0 mol %, with respect to the total number of moles of all monomer units in the polymer A. More preferably, the content ratio is 30.0 to 60.0 mol %. The content ratio of the second monomer units in the polymer A is preferably 5.0 to 80.0 mass %, and more preferably 15.0 to 50.0 mass %.

Expression (V) is preferably satisfied, where $SP_{11}$ $(J/cm^3)^{0.5}$ denotes the SP value of the first monomer units and $SP_{21}$ $(J/cm^3)^{0.5}$ denotes the SP value of the second monomer units.

$$3.00 \leq (SP_{21}-SP_{11}) \leq 25.00 \quad (V)$$

Through control of SP values so as to lie in the above range, good charge distribution uniformity is achieved, and as a result electrostatic offset resistance in low-temperature, low-humidity environments is improved. More preferably, $SP_{21}-SP_{11}$ is 3.00 to 22.00.

The weight-average molecular weight Mw of the polymer A is preferably from 10000 to 200000, more preferably from 20000 to 150000.

Examples of (meth)acrylic acid esters having a C18 to C36 alkyl group include (meth)acrylic acid esters having a C18 to C36 linear alkyl group (for instance stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate and dotriacontanyl (meth)acrylate), and (meth)acrylic acid esters having a C18 to C36 branched alkyl group (for instance 2-decyltetradecyl (meth)acrylate). Preferred among the foregoing is at least one selected from the group consisting of (meth)acrylic acid esters having a C18 to C36 linear alkyl group, and more preferably at least one selected from the group consisting of (meth)acrylic acid esters having a C18 to C30 linear alkyl group, from the viewpoint of the charge performance of the toner Yet more preferred among the foregoing is at least one selected from the group consisting of linear stearyl (meth)acrylate and linear behenyl (meth)acrylate, and particularly preferably at least one selected from the group consisting of linear behenyl(meth)acrylate. The first polymerizable monomer may be used singly as one type; alternatively, at least two types thereof may be used concomitantly.

The polymer A has second monomer units different from the first monomer units. For instance the polymerizable monomers below can be used as the monomer (second polymerizable monomer) for forming the second monomer units. Monomers having a nitrile group; for instance acrylonitrile and methacrylonitrile. Monomers having a hydroxy group; for instance 2-hydroxyethyl (meth)acrylate and 2-hydroxypropyl (meth)acrylate. Monomers having an amide group; for instance acrylamide and monomers obtained through a reaction, in accordance with a known method, of a C1 to C30 amine and a C2 to C30 carboxylic acid having an ethylenically unsaturated bond (such as acrylic acid or methacrylic acid).

Monomers having a urethane group; for instance monomers obtained through reaction, in accordance with known methods, of a C2 to C22 alcohol having an ethylenically unsaturated bond (for instance 2-hydroxyethyl methacrylate or vinyl alcohol), and a C1 to C30 isocyanate (for instance a monoisocyanate compound (such as benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethyl phenyl isocyanate, 3,5-dimethyl phenyl isocyanate or 2,6-dipropyl phenyl isocyanate); an aliphatic diisocyanate compound (for instance trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate or 2,4,4-trimethyl hexamethylene diisocyanate); an alicyclic diisocyanate compound (for instance 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate and hydrogenated tetramethylxylylene diisocyanate); and an aromatic diisocyanate compound (for instance phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate)); and monomers obtained through reaction, in accordance with known methods, of a C1 to C26 alcohol (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol or ercil alcohol) and a C2 to C30 isocyanate having an ethylenically unsaturated bond (for instance 2-isocyanatoethyl (meth)acrylate, 2-(0-[1'-methylpropylideneamino]carboxyamino) ethyl (meth)acrylate, 2-[(3,5-dimethylpyrazolyl)carbonylamino]ethyl (meth)acrylate or 1,1-(bis(meth)acryloyloxymethyl)ethyl isocyanate)).

Monomers having a urea group; for instance monomers obtained through reaction, in accordance with known methods, of a C3 to C22 amine (a primary amine (for instance n-butyl amine, t-butyl amine, propyl amine or isopropyl amine), a secondary amine (for instance di-n-ethyl amine, di-n-propyl amine or di-n-butyl amine), aniline, cycloxylamine or the like), with a C2 to C30 isocyanate having an ethylenically unsaturated bond. Monomers having a carboxy group; for instance methacrylic acid, acrylic acid and 2-carboxyethyl (meth)acrylate. Among the foregoing there is preferably used a monomer having a nitrile group, an amide group, a urethane group, a hydroxy group or a urea group.

As the second polymerizable monomer there is preferably used a vinyl ester such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octylate. Vinyl esters are non-conjugated monomers, and readily exhibit moderate reactivity towards the first polymerizable monomer. As a result, the degree of blocking of the polymer increases, the crystallinity of the first polymerizable monomer is readily increased, and both charging performance and durability can be readily achieved to a greater degree. More preferably, the second polymerizable monomer is at least one selected from the group consisting of acrylonitrile, methacrylonitrile, acrylamide and vinyl acetate.

The second monomer units are more preferably at least one selected from the group consisting of monomer units represented by Formula (2A) below and monomer units represented by Formula (3A) below.

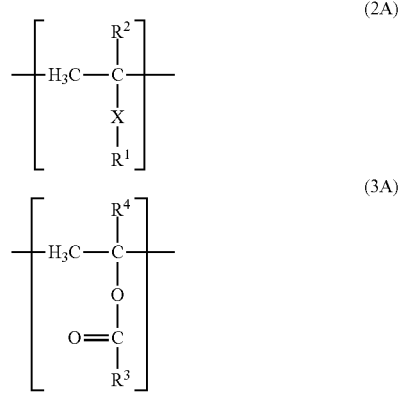

In Formula (2A), X represents a single bond or a C1 to C6 alkylene group;
$R^1$ represents a nitrile group (—C≡N);
an amide group (—C(=O)NHR$^{10}$ (where $R^{10}$ is a hydrogen atom or a C1 to C4 alkyl group));
a hydroxy group;
—COOR$^{11}$ (where $R^{11}$ is a hydrogen atom, a C1 to C6 (preferably a C1 to C4) alkyl group, or a C1 to C6 (preferably a C1 to C4)hydroxyalkyl group);
a urea group (—NH—C(=O)—N(R$^{13}$)$_2$ (where the two $R^{13}$ each represent independently a hydrogen atom or a C1 to C6 (preferably a C1 to C4) alkyl group);
—COO(CH$_2$)$_2$NHCOOR$^{14}$ (where $R^{14}$ is a C1 to C4 alkyl group); or
—COO(CH$_2$)$_2$—NH—C(=O)—N(R$^{15}$)$_2$ (where the two $R^{15}$ represent each independently a hydrogen atom or a C1 to C6 (preferably a C1 to C4) alkyl group). Herein $R^2$ represents a hydrogen atom or a methyl group).

In Formula (3A), $R^3$ represents a C1 to C4 alkyl group, and R represents a hydrogen atom or a methyl group.

In addition to the first monomer units and the second monomer units described above, the polymer A may contain third monomer units obtained by polymerizing a third polymerizable monomer. For instance the following monomers can be used. Styrenes and derivatives thereof such as styrene and o-methylstyrene, and (meth)acrylic acid esters such as methyl (meth)acrylate, n-butyl (meth)acrylate, t-butyl (meth)acrylate, 2-ethylhexyl (meth)acrylate and the like. Styrene is preferred among the foregoing. The content ratio of the third monomer units in the polymer A is preferably 1.0 to 30.0 mass %, and more preferably 5.0 to 20.0 mass %. The content ratio of the third monomer units in the polymer A is preferably 1.0 to 30.0 mol %, more preferably 5.0 to 20.0 mol %.

Other binder resins will be explained next. In addition to a resin having crystalline segments, the binder resin may contain a resin such as those below. Suitable examples of the binder resin include vinyl-based resins and polyester resins. Examples of vinyl-based resins, polyester resins and other binder resins include the following resins and polymers. Homopolymers of styrene and derivatives thereof such as polystyrene and polyvinyltoluene; styrenic copolymers such as styrene-propylene copolymers, styrene-vinyltoluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymer, styrene-butadiene copolymers, styrene-isoprene copolymers, styrene-maleic acid copolymers and styrene-maleic acid ester copolymers; polymethyl methacrylate, polybutyl methacrylate, polyvinyl acetate, polyethylene, polypropylene, polyvinyl butyral, silicone resins, polyamide resins, epoxy resins, polyacrylic resins, rosin, modified rosin, terpene resins, phenolic resins, aliphatic or alicyclic hydrocarbon resins, aromatic petroleum resins and the like. These binder resins may be used singly or in mixtures thereof.

Preferably, the binder resin contains an amorphous polyester resin. The content of the amorphous polyester resin in the binder resin is preferably from 0 mass % to 99.0 mass %, more preferably from 50.0 mass % to 97.0 mass %, yet more preferably from 60.0 mass % to 85.0 mass %.

Examples of monomers used in the amorphous polyester resin include polyhydric alcohols (dihydric or at least trihydric alcohols) and polyvalent carboxylic acids (divalent or at least trivalent carboxylic acids), as well as acid anhydrides and lower alkyl esters thereof.

The polyhydric alcohols below can be used as the polyhydric alcohol. Bisphenol derivatives are preferred as a divalent alcohol component. Examples of bisphenol derivatives include for instance polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, polyoxypropylene(6)-2,2-bis(4-hydroxyphenyl)propane and the like. Examples of other alcohol components include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4- butanetriol, 1,2,5-pentanetriol, glycerin, 2-methylpropane triol, 2-methyl-1,2,4-butanetriol, trimethylol ethane, tritrimethylolpropane and 1,3,5-trihydroxymethylbenzene.

Examples of at least trihydric alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylol ethane, trimethylol propane, 1,3,5-trihydroxymethylbenzene and the like. Glycerol, tritrimethylolpropane and pentaerythritol are preferably used among the foregoing. These dihydric alcohols and at least trihydric alcohol components can be used singly or concomitantly as a plurality thereof.

The polyvalent carboxylic acids below can be used as the polyvalent carboxylic acid. Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid and isooctyl succinic acid, as well as anhydrides and lower alkyl esters of these acids. Maleic acid, futmaric acid, terephthalic acid, and n-dodecenyl succinic acid are preferably used among the foregoing.

Examples of at least trivalent carboxylic acids, acid anhydrides thereof and lower alkyl esters thereof include for instance 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylene carboxypropane, 1,2,4-cyclohexanetricarboxylic acid, tetra(methylenecarboxyl)methane, 1,2,7,8-octanetetracarboxylic acid, pyromellitic acid and Empol trimer acids, as well as acid anhydrides thereof and lower alkyl esters thereof. Preferred among the foregoing is 1,2,4-benzenetricarboxylic acid, i.e. trimellitic acid or derivatives thereof, since these are inexpensive and afford easy reaction control. These divalent carboxylic acids and the like and at least trivalent carboxylic acids can be used singly or concomitantly in combinations of a plurality thereof.

The method for producing the polyester is not particularly limited, and a known method can be resorted to herein. For instance, an alcohol monomer and a carboxylic acid monomer described above are simultaneously charged and are polymerized as a result of an esterification reaction or transesterification reaction, and a condensation reaction, to produce a polyester resin.

The toner particle preferably contains a colorant. Examples of black colorants include carbon black, magnetic bodies and colorants that are color-matched to black through the use of the yellow/magenta cyan colorants listed below. Examples of yellow colorants include the following: condensed azo compounds, isoindolinone compounds, anthraquinone compounds, azo metal complexes, methine compounds and allylamide compounds. Specific examples include the following: C.I. Pigment Yellow 12, 13, 14, 15, 17, 62, 73, 74, 83, 93, 94, 95, 97, 109, 110, 111, 120, 128, 129, 138, 147, 150, 151, 154, 155, 168, 180, 185 and 214.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Specific examples include the following. C.I. Pigment Red 2, 3, 5, 6, 7, 23, 48:2, 48:3, 48:4, 57:1, 81:1, 122, 146, 166, 169, 177, 184, 185, 202, 206, 220, 221, 238, 254 and 269; and C.I. Pigment Violet 19. Examples of cyan colorants include copper phthalocyanine compounds and derivatives thereof, anthraquinone compounds and basic dye lake compounds. Specific examples include C.I. Pigment Blue 1, 7, 15, 15:1, 15:2, 15:3, 15:4, 60, 62 and 66. These colorants can be used singly or in mixtures thereof and also in a solid solution state. The colorant is selected from the viewpoint of hue angle, chroma, lightness, light fastness, OHP transparency, and dispersibility in the toner. The content of the colorant is preferably 1 to 20 parts by mass with respect to 100 parts by mass of the binder resin.

A magnetic body may be incorporated as a colorant into the toner, to yield a magnetic toner. Examples of the magnetic body include the following. Iron oxides such as magnetite, hematite and ferrite; metals such as iron, cobalt and nickel, and alloys and mixtures of the foregoing metals with a metal such as aluminum, copper, magnesium, tin, zinc, beryllium, calcium, manganese, selenium, titanium, tungsten and vanadium. The magnetic body is more preferably a surface-modified magnetic body. In a case where the magnetic toner is prepared by polymerization, preferably the magnetic toner is subjected to a hydrophobic treatment by a surface modification agent that does not hinder polymerization. Examples of such surface modification agents include silane coupling agents and titanium coupling agents.

The number-average particle diameter of the magnetic body is preferably not more than 2.0 μm, and is more preferably 0.1 to 0.5 μm. The content of the magnetic body is preferably 20 to 200 parts by mass, and more preferably 40 to 150 parts by mass, with respect to 100 parts by mass of the binder resin.

The toner particle preferably contains a wax. Examples of wax components include the following. Aliphatic hydrocarbon waxes and derivatives thereof, such as low molecular weight polyethylene, low molecular weight polypropylene, polyolefin copolymers, polyolefin waxes, paraffin waxes, microcrystalline waxes, petrolatum and Fischer-Tropsch wax; montan wax and derivatives thereof; polyolefin waxes such as polyethylene and polypropylene and their derivatives; oxides of aliphatic hydrocarbon waxes such as polyethylene oxide wax; or block copolymers of the foregoing; plant waxes such as candelilla wax, carnauba wax, wood wax and jojoba wax; animal waxes such as beeswax, lanolin and whale wax; mineral waxes such as ozokerite and selecin; waxes mainly composed of aliphatic esters such as montanate ester wax and castor wax; and waxes obtained by deacidifying part or the entirety of a fatty acid ester, such as deacidified carnauba wax. Derivatives include oxides, block copolymers with vinyl-based monomers, and graft-modified products. Further derivatives include fatty acids such as higher fatty alcohols, stearic acid and palmitic acid, or acid amides or esters thereof. The content of the wax is preferably 1 to 25 parts by mass with respect to 100 parts by mass of the binder resin.

A charge control agent may be used in the toner, in order to stabilize the charging performance of the toner. Preferred examples of the charge control agent include organometallic complexes and chelate compounds. Examples thereof include monoazo metal complexes; acetylacetone metal complexes; and metal complexes or metal salts of aromatic hydroxycarboxylic acids or aromatic dicarboxylic acids.

The method for producing the toner particle not particularly limited, and known methods such as pulverization, suspension polymerization, dissolution suspension, emulsification aggregation, dispersion polymerization and the like may be resorted to. For instance a pulverization method includes preferably the following steps. i) step of thoroughly mixing the binder resin constituting the toner particle and, as needed, a wax, a colorant and other additives, using with a mixer such as a Henschel mixer or a ball mill; ii) step of melt-kneading the obtained mixture using a heat kneader such as a twin-screw kneading extruder, a heating roll, a kneader or an extruder, and dispersing or dissolving additives, such as a wax, in the resin; iii) step of pulverization, after cooling and solidification; and iv) step of performing classification as needed, to yield a toner particle.

A shell layer may be formed on the surface of the toner particle prepared in accordance with the above production method, in order to control the wettability of the toner particle and of the organosilicon polymer particle. The method involved is not particularly limited, but in a case where the core particle of the toner particle is produced in accordance with a production method that includes a wet process such as suspension polymerization, emulsion polymerization aggregation, or emulsion aggregation, the core particle is produced, and the shell layer can be formed thereafter through addition, to a liquid, of a compound that constitutes the shell layer.

In a case where the core particle is produced by pulverization, the shell layer can be formed by dispersing the core particle, once having been produced, in an aqueous medium while under concurrent addition of a compound that constitutes the shell layer. In either case, the compound that forms the shell layer may be added in the form of a dispersion, and the shell layer may be formed as a result of a polymerization reaction through addition of a monomer that constitutes a starting material of the shell layer, while the core particle is being dispersed. In a case where the shell layer compound is added in the form of a fine particle to the core particle, the shell layer can be formed by forming, through heating, a film of a fine particulate resin that sticks to the core particle.

A toner production method will be explained next. An organosilicon polymer particle is externally added to and mixed with the toner particle, and are caused to adhere, as necessary, to yield a toner. When the external additive is caused to adhere to the toner particle, the adhesion force is determined by the contact area between the external additive and the toner particle and the adhesion force per unit area, as determined by the types of the external additive and of the toner particle. An organosilicon polymer particle has low surface free energy and high releasability, and accordingly their adhesion force per unit area is low. Therefore, the contact area must be increased in order to increase the adhesion force; on account of the elastic recovery force of the organosilicon polymer particle, however deformation of the toner particle does not proceed even when an impact is applied to the particle, and thus the contact area does not increase readily, and it is difficult to increase the adhesion force.

Although the adhesion force can be increased by increasing the force of one impact and applying that impact continuously, doing so results however in embedding of the organosilicon polymer particle. In order to cause the organosilicon polymer particle to stick to the surface of the toner particle, it is therefore preferable to increase an adhesion rate by relying on heat. Through application of heat, the surface of the toner particle is caused to deform slightly, small voids between the organosilicon polymer particle and the surface of the toner particle are filled up, the contact area increases without burying of the organosilicon polymer particle into the toner particle surface, and the adhesion force can thus be increased. In simultaneous application of heat and an impact force, moreover, the embedding depth of the organosilicon polymer particle can be controlled in accordance with the particle diameter of the organosilicon polymer particle.

In order to improve adhesion of the organosilicon polymer particle a temperature $T_R$ of a heating step is preferably set to be in the vicinity of the glass transition temperature Tg of the toner particle. Specifically, with $T_R$(° C.) as the temperature in the heating step, and Tg (° C.) as the glass transition temperature of the toner particle, the temperature $T_R$ in the heating step satisfies preferably Tg−10 (° C.)≤$T_R$≤Tg+5 (° C.), and more preferably Tg−5 (° C.)≤$T_R$≤Tg+5 (° C.). The mixing process energy at the time of the heating step is preferably $1.0 \times 10^{-3}$ W·h/g to $1.0 \times 10^{-1}$ W·h/g, and more preferably $5.0 \times 10^{-3}$ W·h/g to $5.0 \times 10^{-2}$ W·h/g. The warming time is not particularly limited, but is preferably 3 minutes to 30 minutes, and more preferably 3 minutes to 10 minutes. The glass transition temperature Tg of the toner particle is preferably 40° C. to 70° C., and more preferably 50° C. to 65° C., from the viewpoint of storability.

Figure 2:
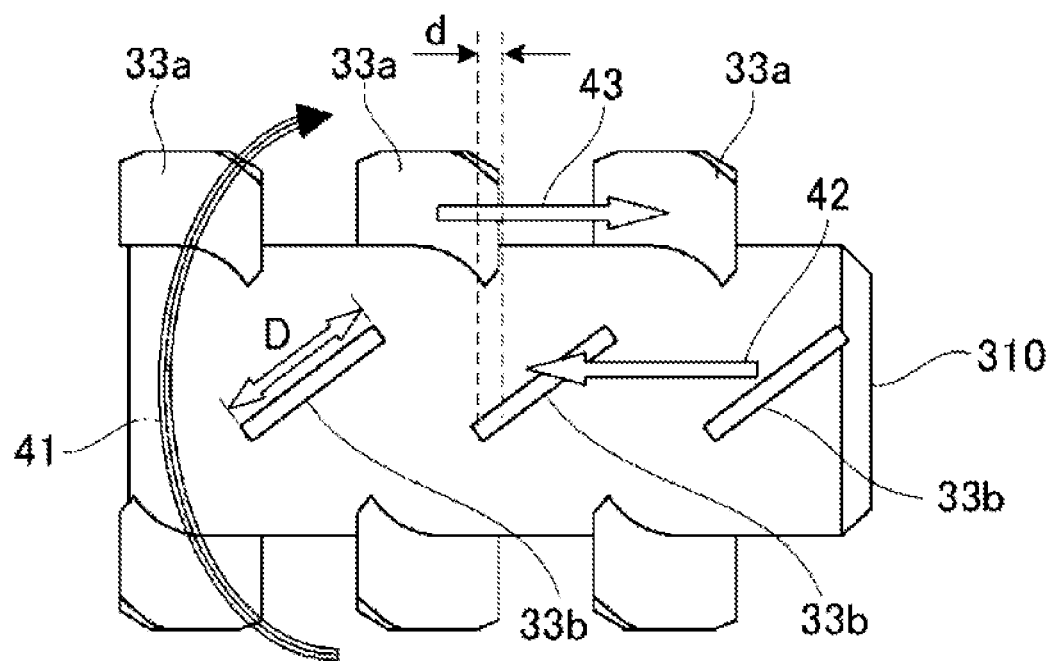
FIG. 2 is an example of the configuration of stirring members used in the mixing process apparatus.

An apparatus having a mixing function is preferred as the apparatus used in the heating step; herein, a known mixing process apparatus can be used, but preferably a mixing process apparatus 1 such as that illustrated in FIG. 1 is particularly preferable. FIG. 1 is a schematic diagram illustrating an example of the mixing process apparatus 1 that can be used in the heating step. FIG. 2 is a schematic diagram illustrating an example of the configuration of stirring members used in the mixing process apparatus 1.

The reference symbols in the drawings are as follows. 1: mixing process apparatus; 31: body casing; 32: rotating member, 33, 33a, 33b: stirring member, 34: jacket; 35: starting material inlet; 36: product outlet; 37: central shaft; 38: drive member; 39: treatment space; 310: rotating member end side face; 41: rotation direction; 42: return direction; 43: feed direction; 316: starting material inlet inner piece; 317: product outlet inner piece; d: spacing denoting the portion of overlap of stirring members; and D: stirring member width The mixing process apparatus 1 has a rotating member 32 having a plurality of stirring members 33 installed on the surface thereof, a drive member 38 that rotationally drives the rotating member 32, and a body casing 31 provided so as to leave a gap with the stirring members 33. At the gap (clearance) between the inner periphery of the body casing 31 and the stirring members 33, the toner particle is heated efficiently and shear is applied uniformly to the toner particle, so that an organosilicon polymer particle can be caused to stick to the surface of the toner particle while being broken up from secondary particles into a primary particle.

The diameter of the inner periphery of the body casing 31 in this mixing process apparatus is not more than twice the diameter of the outer periphery of the rotating member 32. FIG. 1 illustrates an example in which the diameter of the inner periphery of the body casing 31 is 1.7 times the diameter of the outer periphery of the rotating member 32 (diameter of the body of the rotator 32 excluding the stirring members 33). When the diameter of the inner periphery of the body casing 31 is not more than twice the diameter of the outer periphery of the rotating member 32, a treatment space where forces act on the toner particle is moderately restricted and, as a result, the organosilicon polymer particle constituting a secondary particle can be sufficiently dispersed.

Preferably, the above clearance is adjusted in accordance with the size of the body casing. The size of the clearance is suitably 1% to 5% of the diameter of the inner periphery of the body casing 31, since in that case heat is efficiently imparted to the toner particle. Specifically, in a case where the diameter of the inner periphery of the body casing 31 is about 130 mm, the clearance may be set to about 2 mm to 5 mm, while in a case where the inner periphery of the body casing 31 is about 800 mm, the clearance may be set to about 10 mm to 30 mm.

As illustrated in FIG. 2, at least some of the plurality of stirring members 33 are formed as feeding stirring members 33a for feeding the toner particle in the axial direction of the rotating member, accompanying rotation of the rotating member 32. Moreover, at least some of the plurality of stirring members 33 are formed as return stirring members 33b for returning the toner particle in a direction other than the axial direction of the rotating member, accompanying rotation of the rotating member 32. In a case where the starting material inlet 35 and the product outlet 36 are provided at respective ends of the body casing 31, as illustrated in FIG. 1, the direction from the starting material inlet 35 towards the product outlet 36 (rightward direction in FIG. 1) is referred to as "feed direction".

Specifically, the plate surface of the feeding stirring members 33a is tilted so as to feed the toner particle in the feed direction 43, as illustrated in FIG. 2. By contrast, the plate surface of the stirring members 33b is tilted so as to feed the toner particle in the return direction 42. As a result, a warming treatment is performed while under repeated feeding in the feed direction 43 and feeding in the return direction 42. The stirring members 33a and 33b form respective sets of a plurality of members spaced apart from each other in the circumferential direction of the rotating member 32. In the example illustrated in FIG. 2, the stirring members 33a, 33b form respective sets of two members that are spaced by 180 degrees from each other, on the rotating member 32, but may form sets of multiple members, for instance sets of three members spaced from each other by 120°, or sets of four members spaced from each other by 90°.

In the example of the stirring members illustrated in FIG. 2 there are formed a total of 12 equally spaced stirring members 33a and 33b. In FIG. 2, D represents the width of each stirring member, and d represents a distance denoting the overlap between the stirring members. Herein, D is preferably about 20% to 30% of the length of the rotating member 32, from the viewpoint of efficiently feeding the toner particle in the feed direction and the return direction. FIG. 2 illustrates an example in which D is 23% of the length of the rotating member 32. Preferably, a certain overlap portion d between respective stirring members 33b and stirring members 33a appears when drawing an extension line from the end position of each stirring member 33a in the vertical direction.

As a result, the organosilicon polymer particle can be efficiently dispersed on the surface of the toner particle. Preferably, a ratio of d with respect to D ((d/D)×100) is 10% to 30%, from the viewpoint of applying appropriate shear.

Other than a shape such as that illustrated in FIG. 2, the blades may take on a shape such that the toner particle can be fed in the feed direction and the return direction. So long as a clearance can be maintained, the shape of the blades may be for instance a curved surface shape, or a paddle structure shape in which each tip blade portion is joined to the rotating member 32 by a rod-like arm.

A more detailed explanation follows next in accordance with the schematic diagrams of the apparatus illustrated in FIG. 1 and FIG. 2. The apparatus illustrated in FIG. 1 has the rotating member 32 having at least a plurality of stirring members 33 installed on the surface thereof, the drive member 38 that rotationally drives the rotating member, and the body casing 31 provided so as to leave a gap with the stirring members 33. The mixing process apparatus further has the jacket 34 inward of the body casing 31 and adjacent to a rotating member end side face 310, such that a cooling/heating medium can flow through the jacket 34. The mixing process apparatus illustrated in FIG. 1 further has the starting material inlet 33 formed at the top of the body casing 31 and the product outlet 36 formed at the bottom of the body casing 31. The starting material inlet 35 is used in order to introduce the toner particle and the organosilicon polymer particle. The product outlet 36 is used in order to discharge toner having undergone a mixing treatment, to the exterior of the body casing 31.

In the mixing process apparatus illustrated in FIG. 1, a starting material inlet inner piece 316 is inserted in the starting material inlet 35, and a product outlet inner piece 317 is inserted into the interior of the product outlet 36.

Firstly the starting material inlet inner piece 316 is removed from the starting material inlet 35, the toner particle and the organosilicon polymer particle are charged into the treatment space 39 through the starting material inlet 35, and the starting material inlet inner piece 316 is inserted. Next, the rotating member 32 is rotated by the drive member 38 (the reference symbol 41 denotes the rotation direction), to perform a warming and mixing process of the process product that has been charged, while under mixing through stirring by the plurality of stirring members 33 provided on the surface of the rotating member 32.

Warming can be performed by causing warm water at a desired temperature to flow through the jacket 34. The temperature of the warm water is monitored by a thermocouple installed inside the starting material inlet inner piece 316. In order to obtain a toner stably, the temperature Tt of the interior of the starting material inlet inner piece 316 (thermocouple temperature; ° C.) obeys preferably the condition Tg−10 (° C.)≤$T_R$≤Tg+5 (° C.), and more preferably Tg−5° C.≤$T_R$≤Tg+5° C., where Tg (° C.) is the glass transition temperature of the toner particle. As a condition of the warming and mixing process, the power (W/g) of the drive member 38 is preferably controlled so that a mixing process energy E (W·h/g) lies in the range $1.0 \times 10^{-4}$ W·h/g to $1.0 \times 10^{-1}$ W·h/g.

It is preferable to promote slight heat melting of the surface, without further embedding of the organosilicon polymer particle, from a state in which the organosilicon polymer particle has become embedded as a result of the heating step. Accordingly, it is preferable herein not to impart a mechanical impact force to the toner. Meanwhile, some minimum power is required in order to make the coating state of the organosilicon polymer particle uniform; herein it is preferable to control power so that the mixing process energy E (W·h/g) lies within the above range. The power of the drive member 38 denotes a value resulting from subtracting idle power (W) of an operation in which no toner particle is inputted, from power (W) at a time where a toner particle is inputted, and dividing the result by a toner particle input amount (g). The process time depends also on the warming temperature, and accordingly is not particularly limited, but is preferably 3 minutes to 30 minutes, and more preferably 3 minutes to 10 minutes. Toner strength and adhesion can be both readily achieved by controlling the process time so as to lie within the above range.

The rotational speed of the stirring members is linked to the above power, and accordingly is not particularly limited, so long as it lies in the range from $1.0 \times 10^{-4}$ W/g to $1.0 \times 10^{-1}$ W/g. In the apparatus illustrated in FIG. 1 where the volume of the treatment space 39 is $2.0 \times 10^{-3}$ m³, the rotational speed of the stirring members 33 when these have the shape of FIG. 2 is preferably 50 rpm to 500 rpm. More preferably, the rotational speed is 100 rpm to 300 rpm. Once the mixing process is over, the product outlet inner piece 317 is taken out from within the product outlet 36, and the rotating body 32 is caused to rotate by the drive member 38, to discharge the toner through the product outlet 36. Coarse particles of toner may be separated, as the case may require, by a sieving machine such as a circular vibrating sieving machine.

In the case of adhesion of an organosilicon polymer particle elicited as a result of a heating step using the apparatus of mixing process apparatus 1, it is preferable to externally add the organosilicon polymer particle beforehand in an external addition step. In the external addition step the organosilicon polymer particle can be externally added to the toner particle, to yield a toner, using a known mixer such as FM mixer (by Nippon Coke & Engineering Co., Ltd.), Super mixer (by Kawata Manufacturing Co., Ltd.), Nobilta (by Hosokawa Micron Corporation) or Hybridizer (by Nara Machinery Co., Ltd.).

Through warming of the toner in the external addition step, external addition and adhesion can be accomplished in one process; herein a known mixing process apparatus can be used in a case where external addition and adhesion are carried out in one step. In a case where external addition and adhesion are carried out in one process in the external addition step, the foregoing operations may be carried out while under concurrent warming by causing warm water at a desired temperature to flow through the jacket of a known mixer such as FM mixer (by Nippon Coke & Engineering Co., Ltd.), Super mixer (by Kawata Manufacturing Co., Ltd.), Nobilta (by Hosokawa Micron Corporation) or Hybridizer (by Nara Machinery Co., Ltd.).

The methods used to measure the various properties are described herebelow.

Method for Measuring Number-Average PrimaryParticle Diameter of Organosilicon Polymer Particles: Measurement of the number-average primary particle diameter of the organosilicon polymer particle is performed using an "S-4800" scanning electron microscope (product name, Hitachi, Ltd.). Observation is carried out on the toner to which an organosilicon polymer particle have been added; in a visual field enlarged by a maximum of 50,000×, the long diameter of the primary particles of 100 randomly selected organosilicon polymer particles is measured; and the number-average particle diameter is determined. The enlargement factor in the observation is adjusted as appropriate depending on the size of the organosilicon polymer particle.

When the organosilicon polymer particle can be independently acquired as such, measurement can also be performed on this organosilicon polymer particle as such. When the toner contains silicon-containing material other than the organosilicon polymer particle, EDS analysis is carried out on the individual particle of the external additive during observation of the toner and the determination is made, based on the presence/absence of a peak for the element Si, as to whether the analyzed particle is an organosilicon polymer particle.

When the toner contains both an organosilicon polymer particle and silica fine particles, the organosilicon polymer particle is identified by comparing the ratio (Si/O ratio) for the Si and O element contents (atomic %) with a standard. EDS analysis is carried out under the same conditions on standards for both the organosilicon polymer particle and silica fine particles to obtain the element content (atomic %) for both the Si and O. Using A for the Si/O ratio for the organosilicon polymer particle and B for the Si/O ratio for the silica fine particles, measurement conditions are selected whereby A is significantly larger than B. Specifically, the measurement is run ten times under the same conditions on the standards and the arithmetic mean value is obtained for both A and B. Measurement conditions are selected whereby the obtained average values satisfy A/B>1.1.

When the Si/O ratio fora fine particle to be classified is on the Aside from [(A+B)/2], the fine particle is then scored as an organosilicon polymer particle. Tospearl 120A (Momentive Performance Materials Japan LLC) is used as the standard for the organosilicon polymer particle, and HDK VIS (Asahi Kasei Corporation) is used as the standard for the silica fine particles.

Wettability Test for Methanol/water Mixed Solvent: A wettability test of the toner particle and the organosilicon polymer particle towards a methanol/water mixed solvent involves performing a measurement in accordance with the following conditions and procedure, using a powder wettability tester "WET-100P" (by Rhesca Corporation), followed by a calculation on the basis of an obtained methanol-drip transmittance curve. Firstly, 10 g of toner are added to, and dispersed in, water held in a vial and, and the organosilicon polymer particle and other external additives are separated from the toner. Herein a dispersion is produced as a result of a 30 minute treatment using an ultrasonic homogenizer for dispersion. The treatment conditions are as follows.

Ultrasonic treatment Apparatus: ultrasonic homogenizer VP-050 (by Taitec Corporation)
Micro-tip: stepped micro-tip, tip diameter Ø2 mm
Microtip leading end position: central part of glass vial, at a of height of 5 mm from the bottom face of the vial
Ultrasound conditions: strength 100%, 30 minutes. Ultrasound waves are applied, while the vial is cooled with ice water, in such a manner that the temperature of the dispersion does not rise.

The dispersion is transferred to a glass tube (50 mL) for swing rotors, and is centrifuged under conditions of 58.33 $S^{-1}$ and 30 minutes, using a centrifuge (H-9R; by Kokusan Co., Ltd.). In the glass tube after centrifugation, the fraction containing mainly a toner particle and an organosilicon polymer particle can be separated by specific gravity. The obtained fraction is dried under vacuum conditions (40° C./24 hours), to yield a sample. In a case where the organosilicon polymer particle are available on their own, the organosilicon polymer particle can be measured singly.

A fluororesin-coated spindle-type rotor having a length of 25 mm and a maximum trunk diameter of 8 mm is placed in a cylindrical glass container having a diameter of 5 cm and a thickness of 1.75 mm. Then 60.0 mL of distilled water are placed in the above cylindrical glass container, and the whole is treated for 5 minutes in an ultrasonic disperser, in order to remove bubbles and the like. A dried toner particle or an organosilicon polymer particle of 0.1 g, as a specimen, are weighed exactly and then added, to prepare a liquid measurement sample. Then methanol is continuously added dropwise at a rate of 0.8 mL/min into the liquid measurement sample, through a powder wettability tester, while under stirring at a speed of 300 rpm by the spindle-type rotor within the cylindrical glass container, using a magnetic stirrer. The transmittance to light of a wavelength of 780 nm is measured, and respective methanol-drip transmittance curves are created. The methanol concentrations a (vol %) and b (vol %) for a transmittance of 50% are read from the obtained methanol-drip transmittance curves. The methanol concentration is a value calculated on the basis of (volume of methanol present in the cylindrical glass container/volume of the mixture of methanol and water present in the cylindrical glass container)×100.

Identification of the Organosilicon Polymer Particles and Confirmation of the T3 Unit Structure: Pyrolysis gas chromatography/mass spectrometry (also referred to hereafter as "pyrolysis GC/MS") and NMR are used to identify the composition and ratios of the constituent compounds of the organosilicon polymer particle present in the toner. When the toner contains a silicon-containing material and/or external additive other than the organosilicon polymer particle, the toner is dispersed in a solvent, e.g., chloroform, and the organosilicon polymer particle is then separated based on specific gravity differences using, e.g., centrifugal separation. This method is as follows. First, 1 g of the toner is added to and dispersed into 31 g of chloroform filled into a vial and, e.g., the organosilicon polymer particle, other external additive, and so forth, are separated from the toner. The dispersion is prepared by treating for 30 minutes using an ultrasound homogenizer for dispersion. The treatment conditions are as follows.

Ultrasound treatment instrument: VP-050 ultrasound homogenizer (TIETECH Co., Ltd.)
Microtip: stepped microtip, 2 mmφ end diameter
Position of microtip end: center of glass vial, 5 mm height from bottom of vial
Ultrasound conditions: 30% intensity, 30 minutes During this treatment, the ultrasound is applied while cooling the vial with ice water to prevent the temperature of the dispersion from rising. The dispersion is transferred to a glass tube (50 mL) for swing rotor service and centrifugal separation is carried out using a centrifugal separator (H-9R, Kokusan Co., Ltd.) and conditions of 58.33 $S^{-1}$ and 30 minutes. Based on the specific gravity, centrifugal separation can provide separation within the glass tube of a fraction that contains primarily the organosilicon polymer particle. The resulting fraction is dried under vacuum conditions (40° C./24 hours) to obtain the sample. When the organosilicon polymer particle can be acquired as such, the organosilicon polymer particle may then also be measured as such.

Using the sample obtained by the above or an organosilicon polymer particle, the abundance of the constituent compounds of the organosilicon polymer particle and proportion for the T3 unit structure in the organosilicon polymer particle is then measured and calculated using solid-state $^{29}$Si-NMR. Pyrolysis GC/MS is used for analysis of the species of constituent compounds of the organosilicon polymer particle. The species of constituent compounds of the organosilicon polymer particle are identified by analysis of the mass spectrum of the pyrolyzate components derived from the organosilicon polymer particle and produced by pyrolysis of the organosilicon polymer particle at 550° C. to 700° C. Specific measurement method is as follows.

[Measurement Conditions for Pyrolysis GC/MS]
pyrolysis instrument: JPS-700 (Japan Analytical Industry Co., Ltd.)
pyrolysis temperature: 590° C.
GC/MS instrument: Focus GC/ISQ (Thermo Fisher)
column: HP-5MS, 60 m length, 0.25 mm inner diameter, 0.25 μm film thickness
injection port temperature: 200° C.
flow pressure: 100 kPa
split: 50 mL/min
MS ionization: EI
ion source temperature: 200° C.
mass range 45 to 650

The abundance of the identified constituent compounds of the organosilicon polymer particle is then measured and calculated using solid-state $^{29}$Si-NMR. In solid-state $^{29}$Si-NMR, peaks are detected in different shift regions depending on the structure of the functional groups bonded to the Si in the constituent compounds of the organosilicon polymer particle. The structure of the functional groups of each peak can be identified by using a reference sample. The abundance of each constituent compound can be calculated from the obtained peak areas. The determination can be carried out by calculating the proportion for the peak area for the T3 unit structure with respect to total peak area. The measurement conditions for the solid-state $^{29}$Si-NMR are as follows.

instrument: JNM-ECX5002 (JEOL RESONANCE)
temperature: room temperature
measurement method: DDMAS method, $^{29}$Si, 45°
sample tube: zirconia 3.2 mmφ
sample: filled in powder form into the sample tube
sample rotation rate: 10 kHz
relaxation delay: 180 s
scans: 2000

After this measurement, peak separation is performed, for the chloroform-insoluble matter of the organosilicon polymer particle, into the following structure X1, structure X2, structure X3, and structure X4 by curve fitting for silane components having different substituents and bonding groups, and their respective peak areas are calculated. The structure X3 indicated below is the T3 unit structure.

$$\text{structure } X1: (Ri)(Rj)(Rk)SiO_{1/2} \tag{A1}$$

$$\text{structure } X2: (Rg)(Rh)Si(O_{1/2})_2 \tag{A2}$$

$$\text{structure } X3: RmSi(O_{1/2})_3 \tag{A3}$$

$$\text{structure } X4: Si(O_{1/2})_4 \tag{A4}$$

X1:

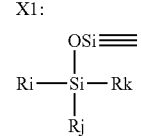

(A1)

X2:

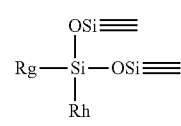

(A2)

X3:

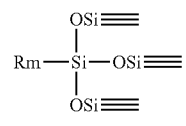

(A3)

X4:

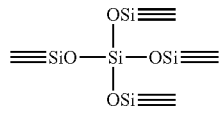

(A4)

The Ri, Rj, Rk, Rg, Rh, and Rm in formulas (A1), (A2), and (A3) represent a silicon-bonded organic group, e.g., a hydrocarbon group having from 1 to 6 carbons, halogen atom, hydroxy group, acetoxy group, or alkoxy group. The hydrocarbon group represented by the aforementioned $R^1$ is identified by $^{13}$C-NMR.

Measurement Conditions for $^{13}$C-NMR (Solid State)
- instrument: JNM-ECX500II from JEOL RESONANCE, Inc.
- sample tube: 3.2 mmϕ
- sample: filled in powder form into the sample tube
- measurement temperature: room temperature
- pulse mode: CP/MAS
- measurement nucleus frequency: 123.25 MHz ($^{13}$C)
- reference material: adamantane (external reference: 29.5 ppm)
- sample rotation rate: 20 kHz
- contact time: 2 ms
- retardation time: 2 s
- number of integrations: 1024

In this method, the hydrocarbon group represented by $R^1$ is confirmed by the presence/absence of a signal originating with, e.g., the silicon atom-bonded methyl group (Si—$CH_3$), ethyl group (Si—$C_2H_5$), propyl group (Si—$C_3H_7$), butyl group (Si—$C_4H_9$), pentyl group (Si—$C_5H_{11}$), hexyl group (Si—$CH_3$), or phenyl group (Si—$C_6H_5$). When a finer structural discrimination is necessary, identification may be carried out using the results of $^1$H-NMR measurement together with the results of the aforementioned $^{13}$C-NMR measurement and $^{29}$Si-NMR measurement.

Method for Quantitating the Organosilicon Polymer Particles Present in the Toner: The content of the organosilicon polymer particle presents in the toner is measured using x-ray fluorescence. The x-ray fluorescence measurement is based on JIS K 0119-1969, and specifically is carried out as follows. An "Axios" wavelength-dispersive x-ray fluorescence analyzer (PANalytical B.V.) is used as the measurement instrument, and the "SuperQ ver. 5.0 L" (PANalytical B.V.) software provided with the instrument is used in order to set the measurement conditions and analyze the measurement data. Rh is used for the x-ray tube anode; a vacuum is used for the measurement atmosphere; and the measurement diameter (collimator mask diameter) is 27 mm. With regard to the measurement, measurement is carried out using the Omnian method in the element range from F to U, and detection is carried out with a proportional counter (PC) in the case of measurement of the light elements and with a scintillation counter (SC) in the case of measurement of the heavy elements.

The acceleration voltage and current value for the x-ray generator are established so as to provide an output of 2.4 kW. For the measurement sample, 4 g of the toner is introduced into a specialized aluminum compaction ring and is smoothed over, and, using a "BRE-32" tablet compression molder (Mackawa Testing Machine Mfg. Co., Ltd.), a pellet is produced by molding to a thickness of 2 mm and a diameter of 39 mm by compression for 60 seconds at 20 MPa, and this pellet is used as the measurement sample.

X-ray exposure is carried out on the pellet molded under the aforementioned conditions, and the resulting characteristic x-rays (fluorescent x-rays) are dispersed with a dispersion element. The intensity of the fluorescent x-rays dispersed at the angle corresponding to the wavelength specific to each element contained in the sample is analyzed by the fundamental parameter method (FP method), the content ratio for each element contained in the toner is obtained as a result of the analysis, and the silicon atom content in the toner is determined.

The content of the organosilicon polymer particle in the toner can be obtained by calculation from the relationship between the silicon content in the toner that is determined by x-ray fluorescence and the content ratio for the silicon in the constituent compounds of the organosilicon polymer particle for which the structure has been established using, e.g., solid-state $^{29}$Si-NMR and pyrolysis GC/MS. When a silicon-containing material other than the organosilicon polymer particle is contained in the toner, using the same methods as described above, a sample provided by the removal from the toner of the silicon-containing material other than the organosilicon polymer particle, can be obtained and the organosilicon polymer particle contained in the toner can be quantitated.

Method for Measuring Penetration Depth (e), Protrusion Height (f), and Index (e/(e+f)) of Penetration of Organosilicon Polymer Particles: (1) Observation of Toner Cross Sections by TEM: A toner is dispersed in a visible-light curable resin (product name: Aronix LCR series D-800, by Toagosei Co. Ltd.), followed by curing through irradiation with—short wavelength light. The obtained cured product is cut out with an ultramicrotome equipped with a diamond knife, to produce a 250 nm flaky sample. Next, the cut sample is magnified at magnifications 40,000- to 50,000 using a transmission electron microscope (product name: electron microscope JEM-2800, by JEOL Ltd.) (TEM-EDX), to obtain cross-sectional images of the particle of toner. The toner to be observed is selected as follows. First, the cross-sectional area of a particle of toner is worked out from an image of the cross-section of the particle, and the diameter of a circle having an area equal to the cross-sectional area (circle-equivalent diameter) is worked out. Only images of cross sections of a toner particle having an absolute value no greater than 1.0 μm of the difference between the circle-equivalent diameter and the weight-average particle diameter (D4) of the toner are observed herein.

(2) Method for Calculating Penetration Depth (e) of Organosilicon Polymer Particles, and Protrusion Height (f) and Index (e/(e+f)) of Penetration of Organosilicon Polymer Particles: Herein there is cut out a TEM image that includes a portion from the surface of one organosilicon polymer particle and of a toner particle, up to about 400 nm in the inward direction of the toner particle. On the TEM image thus cut out there is drawn a line (outline) along the periphery of the toner particle using a line drawing tool (selection of Segmented line in the Straight tab) of the image processing software Image J (available at https://imagej.nih.gov/ij/). At the portion at which the organosilicon polymer particle is buried in the toner particle a connecting line is smoothly drawn, assuming that the buried portion is absent, so as to maintain the curvature around the toner particle. The outline X is not meant to be a straight line. This line is converted (see FIG. 3) to a straight line (Selection in the Edit tab is selected, and line width is modified to 500 pixels in properties, after which Selection in the Edit tab is selected, and Straightener is carried out). As a result a spread image is obtained in which the outline of the toner particle is spread as a straight line. The penetration depth e (nm) and protrusion height f (nm) of the organosilicon polymer particle are worked out in this spread image. An analysis count is set to 100 particles of the organosilicon polymer particle, and respective arithmetic mean values thereof are taken as the values of e and f. Then e/(e+f), which is an index relating to penetration of the organosilicon polymer particle, is worked out on the basis of the values of the penetration depth and protrusion height f.

Method for Measuring Relative Permittivity of Organosilicon Polymer Particles: To measure the relative permittivity of the organosilicon polymer particle there are used a power source and a SI 1260 electrochemical interface (by TOYO Corporation) as an ammeter, and a 1296 dielectric interface (by TOYO Corporation) as a current amplifier. An organosilicon polymer particle separated from a toner in accordance with the method described above can be used herein as a sample. In a case where the organosilicon polymer particle is available on their own, the organosilicon polymer particle can be measured singly. The measurement sample that is used is obtained through heat-molding to a disc-like shape having a thickness of 3.0±0.5 mm, using a tablet molding machine. A gold electrode is produced in a circular shape having a diameter of 10 mm, by mask vapor deposition on the upper and lower faces of the sample. A measurement electrode is attached to the measurement sample thus produced, AC voltage of 100 mVp-p is applied at a frequency of 10 Hz, and capacitance is measured. The relative permittivity a of the measurement sample is calculated on the basis of the expression below.

$$\varepsilon = dC/\varepsilon_0 S$$

d: measurement sample thickness (m)
C: capacitance (F)
$\varepsilon_0$: dielectric constant (F/m) of vacuum
S: electrode surface area (m$^2$)

Method for Measuring the Attachment Index of the Organosilicon Polymer Particles: An evaluation of the amount of transfer of the organosilicon polymer particle when the toner is brought into contact with a substrate is used as the procedure for expressing the state of attachment of the organosilicon polymer particle with an index. With regard to the material of the surface layer of the substrate, a substrate that uses a polycarbonate resin for the surface layer material is used as a substrate that simulates the surface layer of the photosensitive member. Specifically, a coating solution is first prepared by dissolving a bisphenol Z-type polycarbonate resin (product name: Iupilon Z-400, Mitsubishi Engineering-Plastics Corporation, viscosity-average molecular weight (Mv)=40,000) in toluene to a concentration of 10 mass %. Using a #50 Mayer bar, this coating solution is coated on a 50 μm-thick aluminum sheet to form a coating film. This coating film is dried for 10 minutes at 100° C. to produce a sheet having a polycarbonate resin layer (film thickness=10 μm) on the aluminum sheet. This sheet is supported with a substrate holder. The substrate is a square with 3 mm edges. The measurement step is subdivided into a step of placing the toner on the substrate, a step of removing the toner from the substrate, and a step of quantitating the amount of attachment of the organosilicon polymer particle that have been supplied to the substrate, each of which is described in the following.

Step of Placing the Toner on the Substrate: The toner is introduced into a soft, porous material (denoted below as the "toner carrier"), and this toner carrier is brought into contact with the substrate. The method for impregnating the toner into the toner carrier comprises carrying out the following step five times: dipping the toner carrier into a container filled with sufficient toner and then removing the toner carrier. The surface of the toner carrier is visually confirmed to be coated with the toner and not visible. A sponge (product name: White Wiper, Marusan Industry Co., Ltd.) is used for the toner carrier. The toner-loaded toner carrier is fixed to the end of a load cell that itself is fixed to a stage that moves in the perpendicular direction with respect to the contact surface of the substrate, whereby the toner-loaded toner carrier and substrate can be brought into contact while measuring the load. Designating one step as moving the stage to press the toner-loaded toner carrier against the substrate until the load cell displays 10 N and then separating, contact between the toner-loaded toner carrier and substrate is performed by carrying out this step five times.

Step of Removing the Toner from the Substrate: After contact with the toner-loaded toner carrier, an elastomeric suction opening with an inner diameter of approximately 5 mm, which is connected to the nozzle end of a vacuum cleaner, is brought into proximity to the substrate so as to be perpendicular to the toner placement side and the toner adhered on the substrate is removed. This removal is carried out while visually ascertaining the degree to which the toner remains. The distance between the substrate and the end of the suction opening is 1 mm, and the duration of suction is 3 seconds and the suction pressure is 6 kPa.

Step of Quantitating the Amount of Attachment of the Organosilicon Polymer Particles That Have Been Supplied to the Substrate: Image measurement during observation with a scanning electron microscope is used to quantitate the amount and shape of the organosilicon polymer particle that remains on the substrate after removal of the toner. First, after removal of the toner, platinum is sputtered on the substrate using conditions of a current of 20 mA and 60 seconds to prepare a specimen for observation. Any observation magnification that enables observation of the organosilicon polymer particle may be selected for the observation with the scanning electron microscope. A Hitachi Ultrahigh Resolution Field Emission Scanning Electron Microscope (product name: S-4800, Hitachi High-Technologies Corporation) is used for the scanning electron microscope, and observation with the S-4800 (product name) is carried out using the backscattered electron image. 50,000× is used for the observation magnification, 10 kV is used for the acceleration voltage, and 3 mm is used for the working distance.

In the image yielded by the observation, the organosilicon polymer particle is displayed at high brightness and the substrate is displayed at low brightness, and because of this the amount of the organosilicon polymer particle in a visual field can be quantitated by binarization. The binarization conditions are selected as appropriate in accordance with the observation instrument and the sputtering conditions. ImageJ image analysis software (available at https://imagej.nih.gov/ij/) is used for the binarization. Only the area of the organosilicon polymer particle is summed with the ImageJ, and the area ratio for the organosilicon polymer particle in the observed visual field is determined by dividing by the area of the overall observed visual field. This measurement is carried out on 100 binarized images, and the average value thereof is used as the area ratio [c] (unit: area %) for the organosilicon polymer particle on the substrate.

The coverage ratio [d] (unit: area %) by the organosilicon polymer particle on the toner particle is then calculated. The coverage ratio by the organosilicon polymer particle is measured using image measurement in observation with a scanning electron microscope. The same magnification as in the observation of the organosilicon polymer particle on the substrate is adopted for the observation magnification used to observe the organosilicon polymer particle in the observation with the scanning electron microscope. The aforementioned S-4800 Hitachi Ultrahigh Resolution Field Emission Scanning Electron Microscope (product name) is used for the scanning electron microscope. When, in the measurement of the area ratio c and the coverage ratio d, fine particles other than the organosilicon polymer particle are present in the toner, EDS analysis is performed on each of the external additive particles during toner observation, and whether the analyzed particle is an organosilicon polymer particle is scored based on the presence/absence of Si element peaks. In specific terms, the same procedure is carried out as for the number-average primary particle diameter of the organosilicon polymer particle. The conditions for image acquisition are as follows.

(1) Sample Production: A conductive paste is thinly applied onto a sample stand (15 mm×6 mm aluminum sample stand), and toner is blown onto the paste. Air is further blown to remove excess toner from the sample stand, and thoroughly dry the toner. The sample stand is set in a sample holder, and the height of the sample stand is adjusted to 36 mm using a sample height gauge.

(2) Setting of S-4800 Observation Conditions: The coverage ratio [d] of the organosilicon polymer particle is calculated using images obtained through backscattered electron image observation in S-4800. The coverage ratio [d] of the organosilicon polymer particle can be measured with good precision because charge-up is less pronounced in backscattered electron images than in secondary electron images.

Liquid nitrogen is poured into an anti-contamination trap attached to the housing of S-4800, until overflow, and the whole is allowed to stand for 30 minutes. Then "PC-SEM" of S-4800 is operated, to perform flushing (to purify a FE chip as an electron source). An acceleration voltage display portion of the control panel on the screen is clicked, and the [Flushing] button is pressed, to open a flushing execution dialog. Flushing is executed after the flushing strength is confirmed to be 2. It is then checked that an emission current by flushing is from 20 µA to 40 µA. The sample holder is inserted into a sample chamber of the S-4800 housing. Then [Origin] is pressed on the control panel, to transfer the sample holder to the observation position.

The acceleration voltage display portion is clicked to open an HV setting dialog, and acceleration voltage is set to [0.8 kV] and emission current to [20 µA]. In a [Basic] tab of the operation panel, signal selection is set to [SE], [Upper (U)] and [+BSE] are selected as an SE detector, and [L.A. 100] is selected using the selection button to the right of [+BSE], to set a mode of observation on a backscattered electron image.

In the same [Basic] tab of the operation panel, the probe current of a condition block of an electro-optical system is set to [Normal], focus mode to [UHR], and WD to [3.0 mm]. The [ON] button of the acceleration voltage display portion on the control panel is pressed, to apply acceleration voltage.

(3) Focus Adjustment: The magnification indicator in the control panel is dragged to set magnifications to 5000 (5k) magnifications. The [COARSE] focus knob on the operation panel is turned, and the aperture alignment is adjusted once a certain focus is achieved throughout the field of view. Then, [Align] is clicked on the control panel, to display an alignment dialog, and [Beam] is selected. The STIGMA/ALIGNMENT knobs (X, Y) on the operation panel are turned, and the displayed beam is moved to the center of the concentric circle. Then [Aperture] is selected, and the STIGMA/ALIGNMENT knobs (X, Y) are turned one at a time, until image movement ceases or is minimal. The aperture dialog is closed, and focusing is performed using autofocus. This operation is then repeated twice to adjust focus.

In a state where the midpoint of maximum diameter is aligned with the center of the measurement screen, for the target toner, the magnification indicator in the control panel is dragged to set magnifications to 10000 (10k) magnifications. The [COARSE] focus knob on the operation panel is turned, and aperture alignment is adjusted once a certain focus is achieved. Then, [Align] is clicked on the control panel to display an alignment dialog, and [Beam] is selected. The STIGMA/ALIGNMENT knobs (X, Y) on the operation panel are turned, and the displayed beam is moved to the center of the concentric circle.

Then, [Aperture] is selected, and the STIGMA/ALIGNMENT knobs (X, Y) are turned one at a time until image movement ceases or is minimal. The aperture dialog is closed, and focusing is performed using autofocus. Thereafter, magnifications are set to 50000 (50 k) magnifications, focus is adjusted using the focus knob and STIGMA/ALIGNMENT knobs as described above, and focusing is performed once more using autofocus. This operation is repeated again to adjust focus. When the inclination angle of an observation surface is large, the measurement precision of coverage ratio is prone to decrease. To perform the analysis, therefore, an observation surface exhibiting as little inclination as possible is selected by choosing the observation surface so that the entirety thereof becomes focused simultaneously.

(4) Image Storage: Brightness is adjusted in an ABC mode, and 640×480 pixel photographs are captured and stored. The analysis described below is performed using these image files. One photograph is captured for each toner, to obtain images of at least 100 particles of toner.

The observed image is binarized using ImageJ image analysis software (available at https://imagej.nih.gov/ij/). After binarization, via [Analyze]-[Analyze Particles], only the organosilicon polymer particle is extracted based on the EDS analysis and the coverage ratio (unit: area %) by the organosilicon polymer particle on the toner particle is determined. This measurement is carried out on 100 binarized images and the average value of the coverage ratio (unit: area %) by the organosilicon polymer particle is used as the coverage ratio [d] by the organosilicon polymer particle. The attachment index for the organosilicon polymer particle is calculated using the following formula (II) from the area ratio [c] for the organosilicon polymer particle on the substrate and the coverage ratio [d] by the organosilicon polymer particle.

attachment index=area ratio [c] for the organosilicon polymer particle transferred to the polycarbonate film/coverage ratio [d] by the organosilicon polymer particle at the toner particle surface× 100 (II)

Method for Measuring the Dispersity Evaluation Index of the Organosilicon Polymer Particles: The dispersity evaluation index for the organosilicon polymer particle at the toner surface is determined using an "S-4800" scanning electron microscope. In a visual field enlarged by 10,000×, observation at an acceleration voltage of 1.0 kV is performed in the same visual field of the toner to which an organosilicon polymer particle have been externally added. The determination is carried out on the observed image as described in the following using "Image-Pro Plus 5.1J" (Media Cybernetics, Inc.) image processing software.

Binarization is performed such that only organosilicon polymer particle is extracted; the number n of the organosilicon polymer particle and the barycentric coordinates for all the organosilicon polymer particle are determined; and the distance do min to the nearest-neighbor organosilicon polymer particle is determined for each organosilicon polymer particle. The dispersity is given by the following formula using dave for the average value of the nearest-neighbor distances between the organosilicon polymer particles in the image. The dispersity is determined using this procedure on 50 of the toner observed at random, and the arithmetic average value thereof is taken to be the dispersity evaluation index. Smaller values of the dispersity evaluation index indicate a better dispersity. When fine particles other than the organosilicon polymer particle are present in the toner, the organosilicon polymer particle can be differentiated by the EDS analysis referenced above.

$$\text{Dispersity evaluation index} = \sqrt{\frac{\sum_i^n (dn\ min - d\ ave^0)}{a}} \Big/ d\ ave$$

Method for Measuring Content Ratio of Monomer Units in Polymer A: The content ratio of the monomer units in the polymer A is measured by $^1$H-NMR under the conditions below.

Measuring device: FT NMR device JNM-EX400 (by JEOL Ltd.)
Measurement frequency: 400 MHz
Pulse conditions: 5.0 µs
Frequency range: 10500 Hz
Integration count: 64 times
Measurement temperature: 30° C.
Sample: a sample is prepared by placing 50 mg of a measurement sample in a sample tube having an inner diameter of 5 mm, with addition of deuterated chloroform ($CDCl_3$) as a solvent, followed by dissolution in a thermostatic bath at 40° C.

From among the peaks attributed to the constituent elements of the first monomer units, peaks independent from peaks attributed to constituent elements of monomer units otherwise derived are selected on the basis of the obtained $^1$H-NMR chart, and an integration value $S_1$ of the selected peaks is calculated. From among the peaks attributed to constituent elements of the second monomer units there are similarly selected peaks independent from peaks attributed to constituent elements of monomer units otherwise derived, and an integration value $S_2$ of the selected peaks is calculated.

In a case where the polymer A has third monomer units, then from among the peaks attributed to the constituent elements of the third monomer units there are selected peaks independent from peaks attributed to constituent elements of monomer units otherwise derived, and an integration value $S_3$ of the selected peaks is calculated. The content ratio of the first monomer units is worked out as described below using the above integration values $S_1$, $S_2$ and $S_3$. Herein $n_1$, $n_2$ and $n_3$ are the number of hydrogens among the constituent elements to which there are attributed the peaks of interest for each segment.

Content ratio (mol %) of first monomer units=$((S_1/n_1)/((S_1/n_1)+(S_2/n_2)+(S_3/n_3)))\times 100$ The content ratios of the second monomer units and of the third monomer units are worked out in a similar way, as follows.

Content ratio (mol %) of second monomer units=$\{(S_2/n_2)/((S_1/n_1)+(S_2/n_2)+(S_3/n_3))\}\times 100$ Content ratio (mol %) of third monomer units=$\{(S_3/n_3)/((S_1/n_1)+(S_2/n_2)+(S_3/n_3))\}\times 100$ In a case where in the polymer A there is used a polymerizable monomer that contains no hydrogen atom in any constituent element other than vinyl groups, the above content ratio is calculated in the same way as in $^1$H-NMR, but herein resorting to $^{13}$C-NMR using $^{13}$C as the measurement nucleus, in a single-pulse mode. In a case where the toner is produced by suspension polymerization, the peaks of a release agent and the peaks of other resins may overlap each other, and it may not be possible to observe independent peaks. In consequence, the content ratios of monomer units derived from various polymerizable monomers in the polymer A may in some instances be impossible to calculate. In such a case a polymer A' can be similarly produced by suspension polymerization, but without using the release agent or other resins, the polymer A' being then analyzed while being regarded as the polymer A.

Method for Calculating SP Values: Herein $SP_{11}$ and $SP_{21}$ are worked out as described below, in accordance with the calculation method proposed by Fedors. The evaporation energy ($\Delta ei$) (cal/mol) and molar volume ($\Delta vi$)($cm^3$/mol) of atoms or atomic groups in the molecular structure of each polymerizable monomer above are worked out on the basis of the tables given in "Polym. Eng. Sci. 14 (2), 147-134 (1974)", where $(4.184\times\Sigma\Delta ei/\Sigma\Delta vi)^{0.5}$ is taken as the SP value $(J/cm^3)^{0.5}$. Further, the values for $SP_{11}$ and $SP_{21}$ are calculated in accordance with the same calculation method, for the atoms or atomic groups in the molecular structure, in a state where the double bonds of the respective polymerizable monomer have been cleaved through polymerization.

Method for Measuring the Weight-Average Particle Diameter (D4) of the Toner: The weight-average particle diameter (4) of the toner is determined proceeding as follows. The measurement instrument used is a "Coulter Counter Multisizer 3" (registered trademark, Beckman Coulter, Inc.), a precision particle size distribution measurement instrument operating on the pore electrical resistance method and equipped with a 100-µm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels. The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis. In the "modify the standard operating method (SOMME)" screen in the dedicated software, the total count number in the control mode is set to 50,000 particles; the number of measurements is set to 1 time; and the Kd value is set to the value obtained using "standard particle 10.0 µm" (Beckman Coulter, Inc.). The threshold value and noise level are automatically set by pressing the "threshold value/noise level measurement button". In addition, the current is set to 1600 µA; the gain is set to 2; the electrolyte solution is set to ISOTON II; and a check is entered for the "post-measurement aperture tube flush". In the "setting conversion from pulses to particle diameter" screen of the dedicated software, the bin interval is set to logarithmic particle diameter, the particle diameter bin is set to 256 particle diameter bins; and the particle diameter range is set to 2 µm to 60 µm. The specific measurement procedure is as follows.

(1) Approximately 200 mL of the above-described aqueous electrolyte solution is introduced into a 250-mL round bottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30 mL of the aqueous electrolyte solution is introduced into a 100-mL flat bottom glass beaker, and to this is added as dispersing agent approximately 0.3 mL of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. Approximately 3.3 L of deionized water is introduced into the water tank of the ultrasound disperser and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be 10° C. to 40° C.

(6) Using a pipette, the dispersed toner-containing aqueous electrolyte solution prepared in (5) is dripped into the round bottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

EXAMPLES

The present invention is described in greater detail in the following using examples and comparative examples, but the present invention is in no way limited thereto or thereby. Unless otherwise stated, the number of parts and % used in the examples and comparative examples are all mass-based.

Production Example of Organosilicon Polymer Particles 1

First Step: Herein 360 parts of water were placed in a reaction vessel equipped with a thermometer and a stirrer, and 15 parts of hydrochloric acid at a concentration of 5.0 mass % were added, to prepare a uniform solution. Then 136 parts of methyltrimethoxysilane were added, while under stirring at a temperature of 25° C., and with further stirring for 5 hours, followed by filtration to obtain a transparent reaction solution containing a silanol compound or a partial condensate thereof.

Second Step: Herein 440 parts of water were placed in a reaction vessel equipped with a thermometer, a stirrer and a dripping device, and 17 parts of aqueous ammonia having concentration of 10.0 mass % were added, to yield a uniform solution. Then 100 parts of the reaction solution obtained in the first step were added over 0.5 hours, while under stirring at a temperature of 35° C., and the whole was then further stirred for 6 hours, to yield a fine particle dispersion.

Third Step: Then 7 parts of hexamethyldisilazane as a hydrophobizing agent were added to the obtained fine particle dispersion, with stirring at 25° C. for 48 hours; a powder suspension was obtained thereupon in which a powder of hydrophobized spherical fine particles floated at an upper layer of the liquid. After being allowed to stand for 5 minutes, this floating powder was recovered by suction filtration, and was dried under reduced pressure at 100° C. for 24 hours, to yield a dry powder of white organosilicon polymer particle 1. Table 2 sets out the physical properties of the obtained Organosilicon polymer particle 1.

Production Example of Organosilicon Polymer Particles 2 to 11: Organosilicon polymer particles 2 to 11 were obtained in the same way as in the production example of Organosilicon polymer particle 1, but herein conditions such as silane compound, reaction start temperature, catalyst addition amount, dripping time, drying time, hydrophobic treatment amount and so forth were modified as given in Table 1 below. Physical properties are set out in Table 2.

TABLE 1

| Organosilicon polymer particle No. | First step | | | | | | | | |
|---|---|---|---|---|---|---|---|---|---|
| | Water Parts | Hydrochloric acid Parts | Reaction temperature | Silane compound A | | Silane compound B | | Silane compound C | |
| | | | | Name | Parts | Name | Parts | Name | Parts |
| 1 | 360 | 15 | 25 | Methyltrimethoxysilane | 136 | — | — | — | — |
| 2 | 360 | 15 | 25 | Methyltrimethoxysilane | 136 | — | — | — | — |
| 3 | 360 | 15 | 25 | Methyltrimethoxysilane | 136 | — | — | — | — |
| 4 | 360 | 15 | 25 | Methyltrimethoxysilane | 136 | — | — | — | — |
| 5 | 360 | 15 | 25 | Methyltrimethoxysilane | 99 | Tetraethoxysilane | 37 | — | — |
| 6 | 360 | 15 | 25 | Methyltrimethoxysilane | 92 | Tetraethoxysilane | 44 | — | — |

TABLE 1-continued

| | | | | | | | | | | |
|---|---|---|---|---|---|---|---|---|---|---|
| 7 | 360 | 15 | 25 | Methyltrimethoxysilane | 136 | — | — | — | — | — |
| 8 | 360 | 15 | 25 | Methyltrimethoxysilane | 136 | — | — | — | — | — |
| 9 | 360 | 15 | 25 | Methyltrimethoxysilane | 136 | — | — | — | — | — |
| 10 | 360 | 15 | 25 | Methyltrimethoxysilane | 136 | — | — | — | — | — |
| 11 | 360 | 15 | 25 | Methyltrimethoxysilane | 136 | Trimethyl-methoxysilane | 2 | Dimethyldi-methoxysilane | 1 | |

| | Second step | | | | | Third step | | | | |
|---|---|---|---|---|---|---|---|---|---|---|
| Organo-silicon polymer particle No. | Reaction solution obtained in first step Parts | Water Parts | Aqueous ammonia Parts | Reaction start temperature °C. | Dripping time h | Hydrophobizing agent Type | Parts | Reaction temperature °C. | Reaction time h | Drying temperature °C. | Drying time h |
| 1 | 100 | 440 | 17 | 35 | 0.5 | HMDS | 7 | 25 | 48 | 100 | 24 |
| 2 | 100 | 440 | 17 | 35 | 3.5 | HMDS | 7 | 25 | 48 | 100 | 24 |
| 3 | 100 | 440 | 17 | 35 | 0.15 | HMDS | 7 | 25 | 48 | 100 | 24 |
| 4 | 100 | 440 | 17 | 35 | 0.14 | HMDS | 7 | 25 | 48 | 100 | 24 |
| 5 | 100 | 440 | 17 | 35 | 0.5 | HMDS | 7 | 25 | 48 | 100 | 24 |
| 6 | 100 | 440 | 17 | 35 | 0.5 | HMDS | 7 | 25 | 48 | 100 | 24 |
| 7 | 100 | 440 | 17 | 35 | 0.5 | HMDS | 1 | 25 | 48 | 100 | 24 |
| 8 | 100 | 440 | 17 | 35 | 0.5 | HMDS | 10 | 25 | 48 | 100 | 24 |
| 9 | 100 | 440 | 17 | 35 | 0.5 | — | — | — | — | — | — |
| 10 | 100 | 440 | 17 | 35 | 0.5 | HMDS | 3 | 25 | 48 | 100 | 24 |
| 11 | 100 | 440 | 17 | 35 | 0.5 | HMDS | 7 | 25 | 48 | 100 | 24 |

The abbreviation in the table are as follows.
HMDS: hexamethyldisilazane
Other Additives: Additives that were used, other than Organosilicon polymer particles 1 to 11, were prepared as follows. A styrene-2-ethylhexylacrylate-methyl methacrylate-methacrylic acid copolymer having a number-average particle diameter of primary particles of 150 μm and a methanol wettability of 55 vol % was used as Resin fine particle 1. Sol-gel silica particles having been surface-treated with HMDS (hexamethyldisilazane) and having a number-average particle diameter of primary particles of 110 nm were used as Large-particle diameter silica 1. (methanol wettability 80 vol %)

A ratio of T3 unit structures denotes a "proportion of the surface area of a peak derived from silicon constituting a T3 unit structure with respect to the total surface are of peaks derived from all silicon contained in the organosilicon polymer particle".

Production Example of Polymer A1

The materials below were charged, under a nitrogen atmosphere, into a reaction vessel equipped with a reflux condenser, a stirrer, a thermometer and a nitrogen introduction tube.

TABLE 2

| | Number-average particle diameter [nm] | Ratio of T3 unit structures | Relative permittivity εra | Wettability of organosilicon polymer particles Vol % |
|---|---|---|---|---|
| Organosilicon polymer particle1 | 100 | 1.00 | 2.42 | 78 |
| Organosilicon polymer particle2 | 10 | 1.00 | 2.42 | 80 |
| Organosilicon polymer particle3 | 500 | 1.00 | 2.42 | 73 |
| Organosilicon polymer particle4 | 530 | 1.00 | 2.42 | 72 |
| Organosilicon polymer particle5 | 100 | 0.75 | 3.45 | 78 |
| Organosilicon polymer particle6 | 100 | 0.70 | 3.56 | 78 |
| Organosilicon polymer particle7 | 100 | 1.00 | 2.21 | 57 |
| Organosilicon polymer particle8 | 100 | 1.00 | 2.76 | 88 |
| Organosilicon polymer particle9 | 100 | 1.00 | 2.17 | 45 |
| Organosilicon polymer particle10 | 100 | 1.00 | 2.32 | 67 |
| Organosilicon polymer particle11 | 100 | 0.97 | 2.65 | 76 |

Solvent toluene 100.0 parts
Monomer composition 100.0 parts
(the monomer composition is a composition of behenyl acrylate (monomer unit SP value: 18.25, monomer SP value: 17.69), methacrylonitrile (monomer unit SP value: 25.96, monomer SP value: 21.97) and styrene (monomer unit SP value: 20.11, monomer SP value: 17.94), in the proportions given below)
(behenyl acrylate (22 carbon atoms) 67.0 parts (28.9 mol %))
(methacrylonitrile 22.0 parts (53.8 mol %))
(styrene 11.0 parts (17.3 mol %))
Polymerization initiator t-butyl peroxypivalate (Perbutyl PV by NOF Corporation) 0.5 parts A polymerization reaction was conducted for 12 hours through heating at 70° C. while under stirring of the interior of the reaction vessel at 200 rpm, to yield a solution in which a polymer of the monomer composition was dissolved in toluene. Subsequently, the temperature of the solution was lowered to 25° C. and then the solution was added to 1000.0 parts of methanol, while under stirring, to elicit precipitation of a methanol-insoluble fraction. The obtained methanol-insoluble fraction was filtered off was further washed with methanol, and was thereafter vacuum-dried at 40° C. for 24 hours, to yield Polymer A1. The above polymer A1 was analyzed by NMR; the results of monomer unit content yielded 28.9 mol % of monomer units derived from behenyl acrylate, 53.8 mol % of monomer units derived from methacrylonitrile, and 17.3 mol % of monomer units derived from styrene.

Production Example of Polymers A2 to A8: Polymers A2 to A8 were obtained by modifying the monomer formulation from those of the production example of polymer A1 as shown in Table 3 below. Analysis of these polymers by NMR revealed contents of monomer units similar to the molar ratios of addition.

with heating at 180° C., followed by further 2.5 hours of reacting, to yield Amorphous polyester resin 1.

Production Example of Toner Particle 1: Production Example of Toner Particle by Pulverization Polymer A1 30.0 parts
Amorphous polyester resin 1 70.0 parts
Colorant: Pigment Blue 15:3 6.5 parts
Wax: paraffin wax 20.0 parts
(by Nippon Seiro Co., Ltd.: HNP-51, melting point Tm: 74° C.)

The above materials were premixed in a Henschel mixer (by Nippon Coke & Engineering. Co., Ltd.) and were then melt-kneaded using a twin-screw kneading extruder (Model PCM-30, by Ikegai Corp.). The obtained kneaded product was cooled, was coarsely pulverized using a hammer mill, and was thereafter pulverized using a mechanical pulverizer (T-250, by Turbo Kogyo Co., Ltd.). The obtained finely pulverized powder was classified using a multi-grade classifier relying on the Coanda effect, to obtain Toner particle 1 having a weight-average particle diameter (D4) of 7.0 μm.

Production Example of Toner Particles 2 to 11 and 14

Toner particles 2 to 11 and 14 were obtained in the same way as in the production example of toner particle 1, but modifying herein, in the manner given in Table 4, the amount of Amorphous polyester resin 1 and the type and amount of polymer A in the production of Toner particle 1. The physical properties of the respectively obtained toner particles are given in Table 4.

Production Example of Toner Particle 12

Monomer composition 100.0 parts
(the monomer composition contains the following monomers)

TABLE 3

| | First polymerizable monomer | | | | Second polymerizable monomer | | | Third polymerizable monomer | | | |
|---|---|---|---|---|---|---|---|---|---|---|---|
| Polymer No. | Type | Carbon atoms | Parts | Molar parts | Type | Parts | Molar parts | Type | Parts | Molar parts | SP21-SP11 |
| A1 | Behenyl acrylate | 22 | 67 | 28.9 | Methacrylonitrile | 22 | 53.8 | Styrene | 11 | 17.3 | 7.71 |
| A2 | Behenyl acrylate | 22 | 65 | 27.6 | Acrylamide | 25 | 56.9 | Styrene | 10 | 15.5 | 21.0 |
| A3 | Behenyl acrylate | 22 | 60 | 26.2 | Vinyl acetate | 30 | 57.9 | Styrene | 10 | 15.9 | 3.35 |
| A4 | Behenyl acrylate | 22 | 89 | 58.8 | Methacrylonitrile | 11 | 41.2 | — | — | — | 7.71 |
| A5 | Behenyl acrylate | 22 | 25 | 7.00 | Methacrylonitrile | 75 | 93.0 | — | — | — | 3.35 |
| A6 | Myricyl acrylate | 30 | 6 | 23.9 | Methacrylonitrile | 22 | 57.6 | Styrene | 11 | 18.5 | 7.88 |
| A7 | Stearyl acrylate | 18 | 67 | 32.3 | Methacrylonitrile | 22 | 51.2 | Styrene | 11 | 16.5 | 7.57 |
| A8 | Hexadecyl acrylate | 16 | 61 | 28.6 | Methacrylonitrile | 26 | 54.0 | Styrene | 13 | 17.4 | 7.49 |

Production Example of Amorphous Polyester Resin 1

The materials below were weighed in a reaction vessel equipped with a cooling tube, a stirrer and a nitrogen introduction tube.
Terephthalic acid 22.5 parts
Trimellitic anhydride 2.7 parts
Polyoxypropylene (2.2)-2,2-bis (4-hydroxyphenyl)propane 74.8 parts
Titanium dihydroxybis(triethanolaminate) 0.3 parts Thereafter the whole was heated at 200° C., and the reaction was allowed to proceed for 8 hours while under introduction of nitrogen and removal of the generated water. Thereafter 3.0 parts of trimellitic anhydride were added, (hexadecyl acrylate 22.2 parts)
(methacrylonitrile 9.4 parts)
(styrene 68.4 parts)
Colorant: Pigment Blue 15:3 6.5 parts
Amorphous polyester resin 1 1.0 part
Wax: paraffin wax 20.0 parts
(by Nippon Seiro Co., Ltd.: INF-51, melting poi Tm: 74° C.)
Toluene 100.0 parts A mixture made up of the above materials was prepared. The mixture was placed in an attritor (by Nippon Coke & Engineering Co., Ltd.), and was dispersed at 200 rpm for 2 hours using zirconia beads having a diameter of 5 mm, to obtain a starting material dispersion. Meanwhile, 735.0 parts of ion-exchanged water and 16.0 parts of trisodium phosphate (dodecahydrate) were added into a container equipped with a high-speed stirrer homomixer (by Primix Corporation) and a thermometer, and the temperature was raised to 60° C. while under stirring at 12000 rpm. An aqueous solution of calcium chloride resulting from dissolving 9.0 parts of calcium chloride (dihydrate) in 65.0 parts of ion-exchanged water was further added, with stirring for 30 minutes at 12000 rpm while the temperature was held at 60° C. Then the pH was adjusted to 6.0 through addition of 10% hydrochloric acid, to yield an aqueous medium in which an inorganic dispersion stabilizer containing hydroxyapatite was dispersed in water.

Subsequently, the starting material dispersion was transferred to a container equipped with a stirrer and a thermometer, and the temperature was raised to 60° C. while under stirring at 100 rpm. Then 8.0 parts of t-butyl peroxypivalate (by NOF Corporation: Perbutyl PV) as a polymerization initiator were added thereto, with stirring for 5 minutes at 100 rpm while the temperature was held at 60° C.; the resulting product was thereafter added to the aqueous medium being stirred at 12000 rpm using the above high-speed stirring device. Stirring was continued at 12000 rpm for 20 minutes in the above high-speed stirring device while maintaining the 60° C. temperature, to obtain a granulate liquid.

The granulate liquid was transferred to a reaction vessel equipped with a reflux condenser, a stirrer, a thermometer, and a nitrogen introduction tube, and the temperature was raised to 70° C. while under stirring at 150 rpm in a nitrogen atmosphere. A polymerization reaction was carried out at 150 rpm for 10 hours while maintaining the temperature of 70° C. Thereafter, the reflux condenser was removed from the reaction vessel, and the reaction solution was warmed, up to 95° C., after which toluene was removed through stirring for 5 hours at 150 rpm while maintaining the temperature at 95° C., to obtain a toner particle dispersion. The obtained toner particle dispersion was cooled down to 20° C. while under stirring at 150 rpm, after which dilute hydrochloric acid was added, while maintaining stirring as it was, until pH dropped to 1.5, to dissolve the dispersion stabilizer. The solids were filtered off, were thoroughly washed with ion-exchanged water, and were then vacuum-dried at 40° C. for 24 hours, to yield Toner particles 12 containing a polymer of the monomer composition. Physical properties are set out in Table 4.

Production Example of Toner Particle 13:
Production Example of Core Particles

Amorphous polyester resin 1 100.0 parts
C.I. Pigment Blue 15:3 (copper phthalocyani 5.0 parts
Wax: paraffin wax 20.0 parts
Fischer-Tropsch wax (C105 by Sasol Limited, melting point: 10.5° C. 2.0 parts The above materials were pre-mixed using a Mitsui Henschel mixer (by Mitsui Miike Engineering Corporation), and were then melt-kneaded using a twin-screw kneading extruder (product name: PCM-30, by Ikegai Corp.), with the temperature set so that the temperature of the melt product at a discharge port was 140° C. The obtained kneaded product was cooled, and was comely pulverized using a hammer mill, followed by fine pulverization using a crusher (product name: Turbo Mill T250, by Turbo Kogyo Co., Ltd.). The obtained finely pulverized powder was classified using a multi-grade classifier relying on the Coanda effect, to yield core particles having a weight-average particle diameter (D4) of 7.0 sm.

Production Example of Toner Particle

A reaction vessel holding 300.0 parts of ion-exchanged water was maintained at 30° C., and thereafter diluted hydrochloric acid was added thereto, to adjust the pH of the aqueous medium to 4.0. After pH adjustment, 100.0 parts of the obtained core particles were added, to produce a slurry of the core particles. Meanwhile Polymer A8 was added to an aqueous solution resulting from dissolving 3.0 parts of Neogen RK (by DKS Co., Ltd.), which is a dispersing agent (surfactant), in 50 parts of ion-exchanged water and then dispersed, and particle dispersion of polymer A8 for shells having a solids concentration of 50 mass % was prepared Next, in order to add 1.0 part of Polymer A8 for shells to 100 parts of the core particles, there were added 2.0 parts of the particle dispersion of polymer A8 for shells having a solids concentration of 50 mass %, and the temperature was raised to 75° C. and was held there for 2 hours, to thereby form a shell layer on the surface of the core particles. After cooling down to room temperature, the resulting particles were filtered, washed with water and dried, to yield Toner particle 13 having a core-shell structure with a weight-average particle diameter (D4) of 7.0 μm. Physical properties are set out in Table 4.

Production Example of Toner Particle 15:
Production Example of Crystalline Polyester Resin 1

Into an autoclave equipped with a depressurizer, a water separator, nitrogen gas introduction device, a temperature measuring device and a stirring device there were charged:
Adipic acid 175 parts
Ethylene glycol 130 parts
Potassium titanium oxide oxalate 0.40 parts
and the above polyester monomer. The reaction was conducted for 6 hours at 200° C., in a nitrogen atmosphere under normal pressure, after which the reaction was further conducted for 1.5 hours at 220° C., under reduced pressure 10 to 20 mmHg, to yield Crystalline polyester resin 1. The physical properties of the obtained Crystalline polyester resin 1 were acid value=1.3 mgKOH/g and DSC endothermic peak=79.8° C.

Production Example of Toner Particle 15 by
Pulverization: —Crystalline Polyester Resin 1 20.0 Parts Amorphous polyester resin 1 80.0 parts
Colorant: Pigment Blue 15:3 6.5 parts
Wax: paraffin wax 20.0 parts
(by Nippon Seiro Co., Ltd.: HNP-51, melting point Tm: 74° C.)

The above materials were premixed in an FM mixer (by Nippon Coke & Engineering. Co., Ltd.) and were then melt-kneaded using a twin-screw kneading extruder (Model PCM-30, by Ikegai Corp).

The obtained kneaded product was cooled, was coarsely pulverized using a hammer mill, and was thereafter pulverized using a mechanical pulverizer (1-250, by Turbo Kogyo Co., Ltd.). The obtained finely pulverized powder was classified using a multi-grade classifier relying on the Coanda effect, to obtain Toner particle 15 having a weight-average particle diameter (D4) of 7.0 μm. Physical properties are set out in Table 4.

TABLE 4

| | Polymer A | | Number of parts | Weight-average particle diameter (D4) (μm) |
|---|---|---|---|---|
| | Type | Parts | of Amorphous polyester resin 1 | of toner particle |
| Toner particle 1 | Polymer A 1 | 30 | 70 | 7.0 |
| Toner particle 2 | Polymer A 2 | 30 | 70 | 7.0 |
| Toner particle 3 | Polymer A 3 | 30 | 70 | 6.8 |
| Toner particle 4 | Polymer A 4 | 30 | 70 | 6.7 |
| Toner particle 5 | Polymer A 5 | 30 | 70 | 6.8 |
| Toner particle 6 | Polymer A 6 | 30 | 70 | 6.9 |
| Toner particle 7 | Polymer A 7 | 30 | 70 | 7.0 |
| Toner particle 8 | Polymer A 8 | 30 | 70 | 6.9 |
| Toner particle 9 | Polymer A 8 | 3 | 97 | 7.0 |
| Toner particle 10 | Polymer A 8 | 50 | 50 | 7.1 |
| Toner particle 11 | Polymer A 8 | 1 | 99 | 6.9 |
| Toner particle 12 | Described in the specification | | | 7.1 |
| Toner particle 13 | Described in the specification | | | 7.0 |
| Toner particle 14 | — | — | 100 | 7.2 |
| Toner particle 15 | Described in the specification | | | 7.0 |

Production Example of Toner 1

Mixing Process Apparatus 1:

The mixing process apparatus 1 illustrated in FIG. 1 was used herein. An apparatus having an inner periphery diameter of the body casing 31 of 130 mm, and a volume of the treatment space 39 of $2.0 \times 10^{-3}$ m$^3$ was used, with the rated power of the drive member 38 set to 5.5 kW and the shapes of the stirring members 33 set to the shape illustrated in FIG. 2. The overlap width d of the stirring members 33a and stirring members 33b in FIG. 2 was set to 0.25D with respect to the maximum width D of the stirring members 33, and the clearance between the stirring members 33 and the inner periphery of the body casing 31 was set to 3.0 mm. The temperature was adjusted by causing a cooling/heating medium to flow within the jacket.

Mixing Process Apparatus 2:

An FM mixer (FM10C by Nippon Coke & Engineering Co., Ltd.) was used herein.

External Addition Step 1: Herein 100 parts of Toner particle 1 and 1.0 part of Organosilicon polymer particle 1 were mixed for 3 minutes at a rotational speed of 3600 rpm using the mixing process apparatus 2. Mixing was initiated after temperature had stabilized at 30° C. During mixing, the temperature was adjusted to be kept at 30° C.±1° C.

Heating Step: Next, warm water was caused to flow through the interior of the jacket, so that the temperature in the mixing process apparatus 1 having the above configuration was 50° C. Mixing was initiated after temperature had stabilized at 50° C. During mixing, the temperature was adjusted to be kept at 50° C.*1° C. The above external addition toner was charged into the mixing process apparatus 1, and thereafter warming was carried out for 10 minutes while adjusting the peripheral velocity of the outermost end of the stirring members 33 so that the power of the drive member 38 was kept constant at $1.5 \times 10^{-2}$ W/g (rotational speed of the drive member 38: 150 rpm).

External Addition Step 2: External Addition Step of Other External Additives: Hydrophobic silica fine particles were added to the above warmed external toner using an FM mixer (FM10C model, by Nippon Coke & Engineering Co., Ltd.). With the water temperature inside the jacket of the FM mixer stabilized at 30° C.±1° C., there were charged 0.80 parts of hydrophobic silica fine particles (treated with hexamethyldisilazane; BET 200 m$^2$/g). Mixing was initiated at a rotating blade peripheral speed of 3600 rpm, and was continued for 3 minutes while under control of the water temperature and flow rate within the jacket, so that the temperature in the vessel was stabilized at 30° C.*1° C.; this was followed by sifting using a mesh having a mesh opening of 75 μm, to yield Toner 1. Table 5 sets out the toner particle used to prepare Toner 1, and external mixing conditions. Physical properties are set out in Table 6.

Production Example of Toners 2 to 26 and 28 to 33

Toners 2 to 26 and 28 to 33 were obtained in the same way as in the production of Toner 1, but herein with the toner particle, external additive particle, mixing process apparatus and external addition conditions given in Table 5. Physical properties are set out in Table 6.

Production Example of Toner 27: Herein 100 parts of Toner particle 14 and 1.0 part of Organosilicon polymer particle 1 were mixed for 3 minutes at a rotational speed of 3600 rpm using the mixing process apparatus 2. The mixed particles were then transferred to an impact-type processing lid "Hybridization System NHS-1" (by Nara Machinery Co., Ltd.), and were impacted for 5 minutes at a rotational speed of 6000 rpm. Then 0.80 parts of hydrophobic silica fine particles (hexamethyldisilazane-treated, BET 200 m$^2$/g) were added to the above-described toner, with mixing for 3 minutes at a rotational speed of 3600 rpm using the mixing process apparatus 2, to yield Toner 27. The results of the analysis of Toner 27 are given in Table 6.

TABLE 5

| Toner No. | Toner particle No. | Organosilicon polymer particle Type | Parts | Hydrophobic silica fine particles Parts | External addition step 1 Mixing process apparatus No. | Conditions | Temp ° C. |
|---|---|---|---|---|---|---|---|
| 1 | 1 | Organosilicon polymer particle 1 | 1.0 | 0.80 | 2 | 3600 rpm × 3 min. | 30 |
| 2 | 2 | Organosilicon polymer particle 1 | 1.0 | 0.80 | 2 | 3600 rpm × 3 min. | 30 |
| 3 | 3 | Organosilicon polymer particle 1 | 1.0 | 0.80 | 2 | 3600 rpm × 3 min. | 30 |
| 4 | 4 | Organosilicon polymer particle 1 | 1.0 | 0.80 | 2 | 3600 rpm × 3 min. | 30 |
| 5 | 5 | Organosilicon polymer particle 1 | 1.0 | 0.80 | 2 | 3600 rpm × 3 min. | 30 |
| 6 | 6 | Organosilicon polymer particle 1 | 1.0 | 0.80 | 2 | 3600 rpm × 3 min. | 30 |
| 7 | 7 | Organosilicon polymer particle 1 | 1.0 | 0.80 | 2 | 3600 rpm × 3 min. | 30 |
| 8 | 8 | Organosilicon polymer particle 1 | 1.0 | 0.80 | 2 | 3600 rpm × 3 min. | 30 |
| 9 | 8 | Organosilicon polymer particle 2 | 0.10 | 0.80 | 2 | 3600 rpm × 3 min. | 30 |
| 10 | 8 | Organosilicon polymer particle 3 | 5.0 | 0.80 | 2 | 3600 rpm × 3 min. | 30 |
| 11 | 8 | Organosilicon polymer particle 4 | 5.0 | 0.80 | 2 | 3600 rpm × 3 min. | 30 |
| 12 | 8 | Organosilicon polymer particle 4 | 8.5 | 0.80 | 2 | 3600 rpm × 3 min. | 30 |
| 13 | 8 | Organosilicon polymer particle 2 | 0.10 | 0.80 | 2 | 3600 rpm × 3 min. | 30 |
| 14 | 8 | Organosilicon polymer particle 2 | 0.09 | 0.80 | 1 | 3600 rpm × 10 min. | 50 |
| 15 | 8 | Organosilicon polymer particle 5 | 1.0 | 0.80 | 2 | 3600 rpm × 3 min. | 30 |
| 16 | 8 | Organosilicon polymer particle 6 | 1.0 | 0.80 | 2 | 3600 rpm × 3 min. | 30 |
| 17 | 8 | Organosilicon polymer particle 7 | 1.5 | 0.80 | 2 | 3600 rpm × 6 min. | 30 |
| 18 | 8 | Organosilicon polymer particle 1 | 1.0 | 0.80 | 2 | 3600 rpm × 2 min. | 30 |
| 19 | 8 | Organosilicon polymer particle 1 | 1.0 | 0.80 | 2 | 3600 rpm × 1 min. | 30 |
| 20 | 9 | Organosilicon polymer particle 8 | 1.0 | 0.80 | 2 | 3600 rpm × 3 min. | 30 |
| 21 | 10 | Organosilicon polymer particle 9 | 1.0 | 0.80 | 2 | 3600 rpm × 3 min. | 30 |
| 22 | 11 | Organosilicon polymer particle 10 | 1.0 | 0.80 | 2 | 3600 rpm × 3 min. | 30 |
| 23 | 9 | Organosilicon polymer particle 1 | 1.0 | 0.80 | 2 | 3600 rpm × 3 min. | 30 |
| 24 | 8 | Organosilicon polymer particle 1 | 1.0 | 0.80 | 2 | 3600 rpm × 30 min. | 30 |
| 25 | 12 | Organosilicon polymer particle 10 | 1.0 | 0.80 | 2 | 3600 rpm × 3 min. | 30 |
| 26 | 13 | Organosilicon polymer particle 1 | 1.0 | 0.80 | 2 | 3600 rpm × 3 min. | 30 |
| 27 | 14 | Organosilicon polymer particle 1 | 1.0 | 0.80 | Described in the specification | | |
| 28 | 11 | Organosilicon polymer particle 1 | 1.0 | 0.80 | 2 | 3600 rpm × 3 min. | 30 |
| 29 | 9 | Organosilicon polymer particle 11 | 1.0 | 0.80 | 2 | 3600 rpm × 3 min. | 30 |
| 30 | 10 | Organosilicon polymer particle 10 | 1.0 | 0.80 | 2 | 3600 rpm × 3 min. | 30 |
| 31 | 15 | Organosilicon polymer particle 12 | 1.0 | 0.80 | 2 | 3600 rpm × 3 min. | 30 |
| 32 | 8 | Large silica 1 | 1.0 | 0.80 | 2 | 3600 rpm × 3 min. | 30 |
| 33 | 8 | Resin fine particle 1 | 1.0 | 0.80 | 2 | 3600 rpm × 3 min. | 30 |

| Toner No. | Heating process Mixing process apparatus No. | Conditions | Temp ° C. | Mixing process energy E (W · h/g) | External addition step 1 Mixing process apparatus No | Conditions | Temp ° C. |
|---|---|---|---|---|---|---|---|
| 1 | 1 | 150 rpm × 10 min. | 50 | $2.5 \times 10^{-3}$ | 2 | 3600 rpm × 3 min. | 30 |
| 2 | 1 | 150 rpm × 10 min. | 50 | $2.5 \times 10^{-3}$ | 2 | 3600 rpm × 3 min. | 30 |
| 3 | 1 | 150 rpm × 10 min. | 50 | $2.5 \times 10^{-3}$ | 2 | 3600 rpm × 3 min. | 30 |
| 4 | 1 | 150 rpm × 10 min. | 50 | $2.5 \times 10^{-3}$ | 2 | 3600 rpm × 3 min. | 30 |
| 5 | 1 | 150 rpm × 10 min. | 50 | $2.5 \times 10^{-3}$ | 2 | 3600 rpm × 3 min. | 30 |
| 6 | 1 | 150 rpm × 10 min. | 50 | $2.5 \times 10^{-3}$ | 2 | 3600 rpm × 3 min. | 30 |
| 7 | 1 | 150 rpm × 10 min. | 50 | $2.5 \times 10^{-3}$ | 2 | 3600 rpm × 3 min. | 30 |
| 8 | 1 | 150 rpm × 10 min. | 50 | $2.5 \times 10^{-3}$ | 2 | 3600 rpm × 3 min. | 30 |
| 9 | 1 | 150 rpm × 10 min. | 50 | $2.5 \times 10^{-3}$ | 2 | 3600 rpm × 3 min. | 30 |
| 10 | 1 | 150 rpm × 10 min. | 50 | $2.5 \times 10^{-3}$ | 2 | 3600 rpm × 3 min. | 30 |
| 11 | 1 | 150 rpm × 10 min. | 50 | $2.5 \times 10^{-3}$ | 2 | 3600 rpm × 3 min. | 30 |
| 12 | 1 | 150 rpm × 8 min. | 45 | $2.0 \times 10^{-3}$ | 2 | 3600 rpm × 3 min. | 30 |
| 13 | 1 | 150 rpm × 15 min. | 50 | $3.75 \times 10^{-3}$ | 2 | 3600 rpm × 3 min. | 30 |
| 14 | — | — | — | — | 1 | 3600 rpm × 10 min. | 50 |
| 15 | 1 | 150 rpm × 10 min. | 50 | $2.5 \times 10^{-3}$ | 2 | 3600 rpm × 3 min. | 30 |
| 16 | 1 | 150 rpm × 10 min. | 50 | $2.5 \times 10^{-3}$ | 2 | 3600 rpm × 3 min. | 30 |
| 17 | 1 | 150 rpm × 10 min. | 50 | $2.5 \times 10^{-3}$ | 2 | 3600 rpm × 6 min. | 30 |
| 18 | 1 | 150 rpm × 10 min. | 50 | $2.5 \times 10^{-3}$ | 2 | 3600 rpm × 2 min. | 30 |
| 19 | 1 | 150 rpm × 10 min. | 50 | $2.5 \times 10^{-3}$ | 2 | 3600 rpm × 1 min. | 30 |
| 20 | 1 | 150 rpm × 10 min. | 50 | $2.5 \times 10^{-3}$ | 2 | 3600 rpm × 3 min. | 30 |
| 21 | 1 | 150 rpm × 10 min. | 50 | $2.5 \times 10^{-3}$ | 2 | 3600 rpm × 3 min. | 30 |
| 22 | 1 | 150 rpm × 10 min. | 50 | $2.5 \times 10^{-3}$ | 2 | 3600 rpm × 3 min. | 30 |
| 23 | 1 | 150 rpm × 10 min. | 50 | $2.5 \times 10^{-3}$ | 2 | 3600 rpm × 3 min. | 30 |
| 24 | — | — | — | — | 2 | 3600 rpm × 30 min. | 30 |
| 25 | 1 | 150 rpm × 10 min. | 50 | $2.5 \times 10^{-3}$ | 2 | 3600 rpm × 3 min. | 30 |
| 26 | 1 | 150 rpm × 10 min. | 50 | $2.5 \times 10^{-3}$ | 2 | 3600 rpm × 3 min. | 30 |
| 27 | Described in the specification | | | | | | |
| 28 | 1 | 150 rpm × 30 min. | 50 | $7.5 \times 10^{-3}$ | 2 | 3600 rpm × 3 min. | 30 |
| 29 | — | — | — | $2.5 \times 10^{-3}$ | 2 | 3600 rpm × 3 min. | 30 |
| 30 | 1 | 150 rpm × 30 min. | 50 | $2.5 \times 10^{-3}$ | 2 | 3600 rpm × 3 min. | 30 |
| 31 | 1 | 150 rpm × 10 min. | 30 | $2.5 \times 10^{-3}$ | 2 | 3600 rpm × 3 min. | 30 |

TABLE 5-continued

| 32 | 1 | 150 rpm × 10 min. | 50 | $2.5 \times 10^{-3}$ | 2 | 3600 rpm × 3 min. | 30 |
| 33 | 1 | 150 rpm × 10 min. | 50 | $2.5 \times 10^{-3}$ | 2 | 3600 rpm × 3 min. | 30 |

The abbreviation in the table are as follows
Temp: Temperature
min: minutes

TABLE 6

|  | Wettability \| a—b \| | Adhesion index | Dispersity evaluation index | e/(e + f) |
|---|---|---|---|---|
| Toner 1 | 10 | 2.4 | 1.3 | 0.12 |
| Toner 2 | 18 | 2.7 | 1.2 | 0.12 |
| Toner 3 | 6 | 2.1 | 1.4 | 0.12 |
| Toner 4 | 5 | 1.9 | 1.3 | 0.12 |
| Toner 5 | 13 | 2.6 | 1.3 | 0.12 |
| Toner 6 | 9 | 2.5 | 1.3 | 0.10 |
| Toner 7 | 12 | 2.4 | 1.2 | 0.15 |
| Toner 8 | 14 | 2.8 | 1.3 | 0.16 |
| Toner 9 | 16 | 1.6 | 0.8 | 0.32 |
| Toner 10 | 9 | 3.1 | 1.6 | 0.08 |
| Toner 11 | 8 | 3.2 | 1.7 | 0.07 |
| Toner 12 | 8 | 3.4 | 1.4 | 0.05 |
| Toner 13 | 16 | 1.3 | 1.0 | 0.38 |
| Toner 14 | 16 | 0.9 | 1.1 | 0.41 |
| Toner 15 | 14 | 2.5 | 1.3 | 0.16 |
| Toner 16 | 14 | 2.6 | 1.2 | 0.20 |
| Toner 17 | 14 | 2.6 | 0.6 | 0.12 |
| Toner 18 | 14 | 2.5 | 2.0 | 0.11 |
| Toner 19 | 14 | 2.6 | 2.1 | 0.09 |
| Toner 20 | 3 | 2.0 | 1.8 | 0.10 |
| Toner 21 | 10 | 2.4 | 1.9 | 0.10 |
| Toner 22 | 5 | 3.0 | 2.1 | 0.10 |
| Toner 23 | 24 | 3.4 | 2.1 | 0.09 |
| Toner 24 | 16 | 3.5 | 1.1 | 0.04 |
| Toner 25 | 3 | 3.1 | 2.2 | 0.12 |
| Toner 26 | 13 | 2.6 | 1.3 | 0.11 |
| Toner 27 | 36 | 1.5 | 2.5 | 0.79 |
| Toner 28 | 28 | 3.5 | 1.3 | 0.05 |
| Toner 29 | 10 | 3.8 | 1.3 | 0.05 |
| Toner 30 | 33 | 3.5 | 1.5 | 0.05 |
| Toner 31 | 30 | 4.2 | 1.5 | 0.03 |
| Toner 32 | 16 | 1.5 | 1.5 | 0.50 |
| Toner 33 | 9 | 1.5 | 1.5 | 0.43 |

Example 1

Image Forming Apparatus: Toner 1 was evaluated in accordance with evaluation method below. Evaluation results are given in Table 7. The toner contained in a cartridge for a commercially available color laser printer Satera LBP7700C (by Canon Inc.) was removed, the interior was cleaned by air blowing, and then the cartridge was filled with the toner (200 g) to be evaluated. The cartridge was mounted on the printer, and an evaluation was carried out in a low-temperature, low-humidity environment (temperature 15.0° C., humidity 10.0RH %) being an environment in which the charging performance of the toner and charge distribution is prone to be significantly impaired. As a putative long-term durability test, a test was performed through printing of 15000 prints of a horizontal-line pattern with a print percentage of 1%, followed by evaluation of transferability, solid image consistency, ghosting and electrostatic offset. The transfer material used was A4 size GF-C081 (by Canon Inc., 81.4 g/m$^2$).

Initial Transferability and Transferability after Long-term Printing in Low-temperature, Low-humidity Environment: The fixing device of the color laser printer was removed and was modified so as to enable output of unfixed images, and image density was set to be adjustable by a controller. The printer was further modified so as to operate with just a cartridge of one color mounted on the printer. To evaluate transferability, a solid image was outputted under conditions where a toner laid-on level on the photosensitive member was 0.50 mg/cm$^2$ and the untransferred toner on the photosensitive member at the time of formation of a solid image was peeled off by a Mylar tape that had been affixed to the untransferred toner. A reflectance difference was calculated by subtracting a reflectance T0 of tape alone affixed to paper, from reflectance T1 of the peeled tape affixed to paper. The following determination was performed on the basis of the value of that reflectance difference. This evaluation was performed at the beginning and after printing of the above 15,000 prints. Reflectance was measured using REFLECTOMETER MODEL TC-6DS (by Tokyo Denshoku Co., Ltd.).

A: reflectance difference not more than 2.0%
B: reflectance difference higher than 2.0%, and not more than 4.0%
C: reflectance difference higher than 4.0%, and not more than 6.0%
D: reflectance difference higher than 6.0%, and not more than 10.0%
E: reflectance difference higher than 10.0%

Evaluation of Ghosting after Long-term Printing in Low-temperature, Low-humidity Environment: An evaluation was performed in a low-temperature, low-humidity environment using the cartridge after long-term printing, utilized in the above transfer evaluation. As a sample image for ghosting evaluation there was outputted one image in which 15 mm square solid images were disposed at 15 mm intervals from the left end to the right end on the furthest upstream portion, and with a whole-surface halftone image disposed at a spacing of 10 mm from the downstream portion. In the output of the sample image for ghosting evaluation, the portion where the solid image on the upstream side is transferred as a result of one rotation of a toner-supporting roller is used as the portion at which the halftone image on the downstream side is transferred. Ghosting was evaluated on the basis of the obtained sample images. The difference, on the image, between image density at a portion positioned downstream of the solid image area by one rotation of the toner-supporting roller, and image density at a peripheral portion was calculated and was evaluated. The peripheral portion is a portion, of the halftone image portion, other than the portion positioned downstream of the solid image portion by one rotation of the toner-supporting roller Reflection density was measured as the image density, using an SPI filter with a Macbeth densitometer (by MacBeth Corporation), which is a reflection densitometer.

A: image density difference not more than 0.05
B: image density difference larger than 0.05, and not more than 0.10
C: image density difference larger than 0.10, and not more than 0.20
D: image density difference larger than 0.20, and not more than 0.25
E: image density difference larger than 0.25

Evaluation of Electrostatic Offset after Long-term Printing in Low-temperature, Low-humidity Environment: An evaluation was performed in a low-temperature, low-humidity environment using the cartridge after long-term printing, and that was utilized in the above transfer evaluation. Herein 100 prints of a chart for electrostatic offset testing having a solid black image as a first-half image and a white background as a second-half image were continuously outputted, and the electrostatic offset of the images on the 100-th print was evaluated visually. The evaluation criteria of electrostatic offset were established as follows.

A: not observable at all
B: faintly observable in the white background portion
C: observable in the white background portion
D: clearly observable in the white background portion
E: observable in the whole image Solid Image Consistency after Long-term Printing in Low-temperature, Low-humidity Environment: An evaluation was performed in a low-temperature, low-humidity environment using the cartridge after long-term printing, utilized in the above transfer evaluation. Solid image consistency was evaluated according to the difference between the image density at the leading end of a first all-solid image and the image density at the rear end of a third all-solid image. Reflection density was measured as the image density, using an SPI filter with a Macbeth densitometer (by MacBeth Corporation) which is a reflection densitometer.

A: image density difference not more than 0.10
B: image density difference larger than 0.10, and not more than 0.20
C: image density difference larger than 0.20, and not more than 0.30
D: image density difference larger than 0.30, and not more than 0.40
E: image density difference larger than 0.40

Transferability after Long-term Printing in High-temperature, High-humidity Environment: Transferability was evaluated herein using a commercially available color laser printer Satera LBP7700C (by Canon Inc.), in the same way as in the evaluation of transferability in the above low-temperature, low-humidity environment. The toner held in a cartridge was removed, the interior was cleaned by air blowing, and then the cartridge was filled with the toner (200 g) to be evaluated. The above cartridge was mounted on the printer, and an evaluation was carried out in a high-temperature, high-humidity environment (temperature 30.0° C., humidity 80.0RH %). As a putative long-term durability test, a durability test was performed through printing of 1000 prints of a horizontal-line pattern with a print percentage of 1%, followed by evaluation of transferability. To evaluate transferability, a solid image was outputted under conditions where a toner laid-on level on the photosensitive member was 0.50 mg/cm$^2$, and the untransferred toner on the photosensitive member at the time of formation of a solid image was peeled off by a Mylar tape that had been affixed to the untransferred toner. A reflectance difference was calculated by subtracting a reflectance TO of tape alone affixed to paper, from reflectance TI of the peeled tape affixed to paper. The following determination was performed on the basis of the value of that reflectance difference. Reflectance was measured using REFLECTOMETER MODEL TC-6DS (by Tokyo Denshoku Co., Ltd.).

A: reflectance difference not more than 2.0%
B: reflectance difference higher than 2.0%, and not more than 4.0%.
C: reflectance difference higher than 4.0%, and not more than 6.0%.
D: reflectance difference higher than 6.0%, and not more than 10.0%
E: reflectance difference higher than 10.0%

Examples 2 to 26, and Comparative Examples 1 to 7

The same evaluations as in Example 1 were performed using Toners 2 to 33. The evaluation results are given in Table 7.

TABLE 7

| | | Low temperature, low-humidity environment | | | | | | | | High-temperature, high-humidity environment Transferability | |
|---|---|---|---|---|---|---|---|---|---|---|---|
| | | Transferability | | Solid image consistency | | Ghosting | | Electrostatic offset resistance | | | |
| | Toner No. | Initial | | After 15,000 prints | | After 15,000 prints | | After 15,000 prints | | After 15,000 prints | |
| Example 1 | 1 | A | 0.3 | A | 0.5 | A | 0.01 | A | 0.01 | A | A 0.2 |
| Example 2 | 2 | A | 0.6 | A | 0.8 | A | 0.02 | A | 0.03 | A | A 0.4 |
| Example 3 | 3 | A | 0.6 | A | 0.8 | A | 0.02 | A | 0.02 | A | A 0.6 |
| Example 4 | 4 | A | 0.4 | A | 0.9 | A | 0.02 | A | 0.04 | A | A 0.4 |
| Example 5 | 5 | A | 0.5 | A | 0.8 | A | 0.02 | A | 0.02 | A | A 0.3 |
| Example 6 | 6 | A | 0.6 | A | 1.0 | A | 0.03 | A | 0.03 | A | A 0.2 |
| Example 7 | 7 | A | 0.6 | A | 1.2 | A | 0.02 | A | 0.02 | A | A 0.4 |
| Example 8 | 8 | A | 0.6 | A | 1.4 | A | 0.03 | A | 0.02 | A | A 0.1 |
| Example 9 | 9 | A | 0.4 | A | 1.5 | A | 0.02 | A | 0.04 | A | A 0.3 |
| Example 10 | 10 | A | 0.5 | A | 1.4 | A | 0.07 | A | 0.02 | A | A 0.2 |
| Example 11 | 11 | A | 0.5 | A | 1.3 | B | 0.12 | A | 0.03 | B | A 0.4 |
| Example 12 | 12 | A | 0.6 | B | 1.1 | B | 0.15 | A | 0.02 | B | A 0.3 |
| Example 13 | 13 | A | 0.5 | A | 1.2 | A | 0.04 | B | 0.08 | B | A 0.5 |
| Example 14 | 14 | A | 0.9 | A | 1.6 | A | 0.04 | C | 0.15 | B | A 0.4 |
| Example 15 | 15 | A | 1.1 | A | 1.9 | A | 0.03 | A | 0.03 | B | A 0.3 |
| Example 16 | 16 | B | 2.2 | B | 2.9 | A | 0.06 | A | 0.04 | B | A 0.5 |
| Example 17 | 17 | A | 1.0 | A | 1.2 | A | 0.07 | A | 0.02 | B | A 0.2 |
| Example 18 | 18 | A | 1.3 | A | 1.7 | B | 0.14 | A | 0.03 | B | A 0.4 |
| Example 19 | 19 | A | 1.5 | A | 1.6 | C | 0.25 | A | 0.04 | B | A 0.3 |
| Example 20 | 20 | A | 1.0 | A | 1.8 | A | 0.07 | A | 0.05 | B | B 2.4 |

TABLE 7-continued

| | | Low temperature, low-humidity environment | | | | | High-temperature, high-humidity environment |
|---|---|---|---|---|---|---|---|
| | | Transferability | | Solid image consistency | Ghosting | Electrostatic offset resistance | Transferability |
| | Toner No. | Initial | After 15,000 prints | After 15,000 prints | After 15,000 prints | After 15,000 prints | After 15,000 prints |
| Example 21 | 21 | A 1.2 | A 1.7 | A 0.08 | A 0.03 | B | A 1.2 |
| Example 22 | 22 | A 1.1 | A 1.8 | C 0.24 | A 0.02 | C | C 4.6 |
| Example 23 | 23 | B 2.6 | C 4.5 | C 0.26 | A 0.01 | C | A 1.3 |
| Example 24 | 24 | A 1.4 | C 4.9 | B 0.12 | C 0.17 | A | A 1.5 |
| Example 25 | 25 | A 1.3 | A 1.9 | C 0.25 | A 0.03 | B | C 4.9 |
| Example 26 | 26 | A 1.5 | A 1.7 | A 0.07 | A 0.04 | B | A 1.4 |
| Comparative example 1 | 27 | C 5.9 | E 11.5 | C 0.29 | D 0.25 | D | C 5.6 |
| Comparative example 2 | 28 | B 3.9 | D 6.5 | B 0.16 | A 0.02 | D | C 5.4 |
| Comparative example 3 | 29 | B 3.2 | D 6.8 | B 0.14 | A 0.03 | C | B 2.9 |
| Comparative example 4 | 30 | B 2.9 | D 7.2 | B 0.17 | A 0.02 | D | D 7.2 |
| Comparative example 5 | 31 | B 2.7 | D 7.6 | B 0.16 | A 0.03 | D | C 5.1 |
| Comparative example 6 | 32 | B 3.5 | E 12.3 | B 0.15 | D 0.24 | D | B 2.4 |
| Comparative example 7 | 33 | C 5.7 | E 12.9 | B 0.15 | D 0.25 | D | E 13.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-045833, filed Mar. 16, 2020, which is hereby incorporated by reference herein in its entirety.

What is claimed is:

1. A toner, comprising:
a toner particle comprising a binder resin, the binder resin containing a vinyl polymer A having a crystalline segment, polymer A comprising a monomer unit derived from behenyl acrylate, a monomer unit derived from methacrylonitrile, and a monomer unit derived from styrene; and
an organosilicon polymer particle on a surface of the toner particle, wherein
|a−b|≤25 when a (vol %) is a first methanol concentration at a time of a transmittance of 50% relative to light of a wavelength of 780 nm in a wettability test on the organosilicon polymer using a methanol/water mixed solvent, and b (vol %) is a second methanol concentration at a time of a transmittance of 50% relative to light of a wavelength of 780 nm in a wettability test on the toner particle using a methanol/water mixed solvent,
the first methanol concentration is 78 to 100 vol %,
primary particles of the organosilicon polymer particle have a number-average particle diameter of 20 to 300 nm,
the organosilicon polymer particle has a relative permittivity of not more than 2.60 measured at 10 Hz, and
an adhesion index of the organosilicon polymer particle on a polycarbonate film is not more than 3.5 where the adhesion index=(area ratio of organosilicon polymer particle migrated to the polycarbonate film/coverage ratio of the organosilicon polymer particle on the surface of the toner particle)×100.

2. The toner according to claim 1, wherein the organosilicon polymer particles have a dispersity evaluation index of 0.5 to 2.0 on the toner surface.

3. The toner according to claim 1, wherein the organosilicon polymer particle has a T3 unit structure represented by $R^1$—$SiO_{3/2}$ where $R^1$ represents a C1 to C6 alkyl group or phenyl group, and
a proportion of a surface area of a peak derived from silicon constituting the T3 unit structure is 0.50 to 1.00 in a $^{29}$Si-NMR measurement of the organosilicon polymer particle with respect to a total surface area of a peak derived from all silicon contained in the organosilicon polymer particle.

4. The toner according to claim 1, wherein 0.05≤e/(e+f) ≤0.40 when a cross-sectional image of the toner is observed using a transmission electron microscope and a spread image of the cross-sectional image is obtained by spreading an outline of the toner particle into a straight line, with an outline X being an outline of a portion of contact in the spread image between the organosilicon polymer particle and the toner particle, line segment Z being a line segment obtained by joining both ends of the outline X with a straight line, and an outline Y being an outline of a portion other than the outline X in the outline of the organosilicon polymer particle, where e (nm) denotes a penetration depth of the organosilicon polymer particle penetrating from the surface of the toner particle into an interior of the toner particle defined by a maximum distance between the line segment Z and an intersection x of the outline X and a perpendicular line from the line segment Z to the outline X, and f (nm) denotes a protrusion height of the organosilicon polymer particle from the surface of the toner particle defined by a maximum distance between the line segment Z and an intersection y of the outline Y and a perpendicular line from the line segment Z to the outline Y.

5. The toner according to claim 1, wherein a content ratio of the monomer unit derived from behenyl acrylate in polymer A is 5.0 to 60.0 mol % with respect to a total number of moles of all monomer units in polymer A, and a content ratio of the monomer unit derived from methacrylonitrile in polymer A is 20.0 to 95.0 mol % with respect to a total number of moles of all monomer units in polymer A.

6. The toner according to claim 1, wherein the organosilicon polymer particle is present in the toner at 0.2 to 6.0 mass %.

* * * * *